US012634859B2

(12) United States Patent
Kiilerich Pratas et al.

(10) Patent No.: US 12,634,859 B2
(45) Date of Patent: May 19, 2026

(54) TIMING ADVANCE VALIDATION FOR SMALL DATA TRANSMISSION

(71) Applicant: Nokia Technologies Oy, Espoo (FI)

(72) Inventors: Nuno Manuel Kiilerich Pratas, Aalborg (DK); Daniela Laselva, Aalborg (DK); Karri Markus Ranta-Aho, Espoo (FI); Sofonias Hailu, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 278 days.

(21) Appl. No.: 18/553,014

(22) PCT Filed: Apr. 1, 2021

(86) PCT No.: PCT/CN2021/085107
§ 371 (c)(1),
(2) Date: Sep. 28, 2023

(87) PCT Pub. No.: WO2022/205377
PCT Pub. Date: Oct. 6, 2022

(65) Prior Publication Data
US 2024/0188018 A1    Jun. 6, 2024

(51) Int. Cl.
*H04W 56/00*          (2009.01)
(52) U.S. Cl.
CPC ................................ *H04W 56/0045* (2013.01)
(58) Field of Classification Search
None
See application file for complete search history.

(56) References Cited

U.S. PATENT DOCUMENTS

2019/0191399 A1    6/2019  Islam et al.
2020/0029292 A1    1/2020  Zou et al.
(Continued)

FOREIGN PATENT DOCUMENTS

CN        112567847 A      3/2021
WO    2020/164817 A1      8/2020
(Continued)

OTHER PUBLICATIONS

"Work Item on NR smalldata transmissions in INACTIVE state", 3GPP TSG RAN Meeting #86, RP-193252, Agenda Item: 9.1.2, ZTE Corporation, Dec. 9-12, 2019, 4 pages.
(Continued)

*Primary Examiner* — Willie J Daniel, Jr.
(74) *Attorney, Agent, or Firm* — SQUIRE PATTON BOGGS (US) LLP

(57) ABSTRACT

Example embodiments of the present disclosure relate to Timing Advance validation for Small Data Transmissions. A first device includes at least one processor; and at least one memory including computer program codes; wherein the at least one memory and the computer program codes are configured to, with the at least one processor, cause the first device to: receive TA validation configuration information associated with one or more downlink reference beams for an inactive state of the first device from a second device, select a CG resource to transmit a data packet to the second device based on a CG resource configuration for small data transmissions of the first device, and verify, based at least on the TA validation configuration information and the selected CG resource, TA validity of the first device.

19 Claims, 11 Drawing Sheets

(56)                    References Cited

U.S. PATENT DOCUMENTS

| | | | |
|---|---|---|---|
| 2020/0107283 A1 | 4/2020 | Ratasuk et al. | |
| 2020/0107389 A1 | 4/2020 | Charbit et al. | |
| 2020/0196264 A1 | 6/2020 | Shih et al. | |
| 2020/0322981 A1 | 10/2020 | Choe et al. | |
| 2021/0037530 A1 | 2/2021 | Shih et al. | |
| 2021/0084482 A1 | 3/2021 | Poitau et al. | |
| 2023/0217394 A1* | 7/2023 | Frederiksen | H04W 56/0045 |
| | | | 370/503 |

FOREIGN PATENT DOCUMENTS

| | | |
|---|---|---|
| WO | 2020/188144 A1 | 9/2020 |
| WO | 2020/222180 A1 | 11/2020 |
| WO | 2020/225161 A1 | 11/2020 |

OTHER PUBLICATIONS

"3rd Generation Partnership Project; Technical Specification Group Services and System Aspects; Feasibility study on 5G message service for MIoT; Stage 1 (Release 16)", 3GPP TR 22.824, V16.0.0, Sep. 2018, pp. 1-27.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.3.0, Dec. 2020, pp. 1-1084.

"PUR TA validation & Release", 3GPP TSG-RAN WG2 #105, R2-1900737, Agenda Item: 12.2.4, Ericsson, Feb. 25- Mar. 1, 2019, pp. 1-4.

"IEEE 802.11", Wikipedia, Retrieved on Sep. 24, 2024, Webpage available at : https://en.wikipedia.org/wiki/IEEE_802.11.

International Search Report and Written Opinion received for corresponding Patent Cooperation Treaty Application No. PCT/CN2021/085107, dated Jan. 6, 2022, 9 pages.

"Report from email discussion [POST112-e][550][SDT] Further details of CG aspects", 3GPP RAN WG2 Meeting #113e, R2-2100930, Agenda Item: 8.6.1, Lenovo, Jan. 25-Feb. 5, 2021, pp. 1-31.

"LS on uplink timing alignment for small data transmissions", 3GPP TSG RAN WG1 #104bis-e, R1-2102286, TSG RAN WG2, Apr. 12-20, 2021, 2 pages.

"Support of CG based small data transmission", 3GPP TSG-RAN WG3 Meeting #111-e, R3-210140, Agenda item: 8.1, Huawei, Jan. 25-Feb. 5, 2021, 2 pages.

Tentative Rejection received for corresponding Taiwanese Patent Application No. 111111678, dated Oct. 14, 2022, 73 pages of Tentative Rejection and 6 pages of summary and translation available.

"Aspects specific to CG based schemes", 3GPP TSG-RAN WG2 Meeting #113 Electronic, R2-2101147, Agenda item: 8.6.5, Nokia, Jan. 25-Feb. 5, 2021, 5 pages.

Office action received for corresponding Bangladesh Patent Application No. 135/2022, dated Feb. 20, 2025, 1 page.

Office action received for corresponding Indian Patent Application No. 202347073895, dated Mar. 21, 2025, 7 pages.

Office action received for corresponding Argentinian Patent Application No. 20220100798, dated Aug. 18, 2025, 6 pages of office action and no pages of translation available.

Extended European Search Report received for corresponding European Patent Application No. 21934035.3, dated Nov. 28, 2024, 8 pages.

"Configured Grant based Small Data Transmission", 3GPP TSG-RAN2 Meeting #112 Electronic, R2-2009094, Agenda item: 8.6.5, Samsung, Nov. 2-13, 2020, 8 pages.

"Handling of Configured grant for SDT", 3GPP TSG RAN WG2 Meeting #113-e, R2-2100368, Agenda item: 8.6.5, Intel Corporation, Jan. 25-Feb. 5, 2021, 4 pages.

Argentinian Office Action, with partial English translation, corresponding to AR Application No. 20220100798, dated Dec. 15, 2025.

* cited by examiner

700

702
DETERMINE A SERVING
SSB BEAM

704
MORE THAN ONE
COVERAGE?

YES

706
N1 > N2?    NO

YES

708
IN THE FIRST LIST?

NO

YES

712
IN THE SECOND LIST?    NO

YES    714
DETERMINE RSRP VARIATION
OF FIRST DEVICE

710
SUCCESSFULLY VERIFY
TA VALIDITY    YES    716
SMALLER THAN
RSRP THRESHOLD?

NO

720
FAIL TO VERIFY TA
VALIDITY

TIMING ADVANCE VALIDATION FOR SMALL DATA TRANSMISSION

RELATED APPLICATION

This application was originally filed as PCT Application No. PCT/CN2021/085107 on Apr. 1, 2021, which is incorporated herein by reference in its entirety.

FIELD

Embodiments of the present disclosure generally relate to the field of telecommunication and, in particular, to a method, device, apparatus and computer readable storage medium for Timing Advance (TA) validation for Small Data Transmissions (SDT) by a user equipment (UE) in an inactive state.

BACKGROUND

A new independent Radio Resource Control (RRC) state, referred to as RRC_INACTIVE, was introduced in 3GPP NR Rel-15 complementing the existing states of RRC_CONNECTED and RRC_IDLE, with the goal of lean signalling and energy-efficient support of New Radio (NR) services. Although such a design was conceived particularly for Enhanced mobile broadband (cMBB)/Mobile Internet of Things (MIoT) services, it could be beneficial to efficiently deliver small or infrequent traffic of cMBB and Ultra-Reliable Low Latency Communication (URLLC) services as well.

The RRC_INACTIVE state enables UEs to more quickly resume the connection and start the transmission of small or sporadic data with a much lower initial access delay and associated signalling overhead as compared to the RRC_IDLE state. This is achieved mainly thanks to reduced control signalling required for requesting and obtaining the resume of a suspended RRC connection, which may result in UE power saving. At the same time, a UE in the RRC_INACTIVE state is able to achieve similar power saving as in RRC_IDLE, benefiting from a much larger period of Physical Downlink Control Channel (PDCCH) monitoring (e.g. paging) and relaxed measurements compared to the RRC_CONNECTED state, for example. Furthermore, compared to keeping the UE in the RRC_CONNECTED state, the RRC_INACTIVE state minimizes mobility signalling both to the Radio Access Network (RAN) and to the core network. When a UE is transited to the RRC_INACTIVE state via an RRC Connection Suspend message, the UE Access Stratum (AS) context (referred to as UE Inactive AS Context), necessary for the quick start of the connection, is maintained both at the UE side and the RAN side, and it is identified by the UE identifier, i.e. Inactive-RNTI (I-RNTI).

Although it has been agreed to support SDT services in the inactive state of UEs, there are still some problems to be solved on how to support the SDT services.

SUMMARY

In general, example embodiments of the present disclosure provide a solution for supporting SDT services by UEs in the inactive state. More particularly, the embodiments of the present disclosure provide a solution for TA validation for the SDT services.

In a first aspect, there is provided a first device. The first device includes at least one processor; and at least one memory including computer program codes; wherein the at least one memory and the computer program codes are configured to, with the at least one processor, cause the first device to: receive TA validation configuration information associated with one or more downlink reference beams for an inactive state of the first device from a second device, select a CG resource to transmit a data packet to the second device based on a CG resource configuration for small data transmissions of the first device, and verify, based at least on the TA validation configuration information and the selected CG resource, TA validity of the first device.

In a second aspect, there is provided a method. The method includes receiving TA validation configuration information associated with one or more downlink reference beams for an inactive state of a first device from a second device, selecting a CG resource to transmit a data packet to the second device based on a CG resource configuration for small data transmissions of the first device, and verifying, based at least on the TA validation configuration information and the selected CG resource, TA validity of the first device.

In a third aspect, there is provided an apparatus comprising means for receiving TA validation configuration information associated with one or more downlink reference beams for an inactive state of a first device from a second device, means for selecting a CG resource to transmit a data packet to the second device based on a CG resource configuration for small data transmissions of the first device, and means for verifying, based at least on the TA validation configuration information and the selected CG resource, TA validity of the first device.

In a fourth aspect, there is provided a non-transitory computer readable medium comprising program instructions for causing an apparatus to perform at least the method according to the above second aspect.

With the solution of the present disclosure, TA validation may be performed by UEs in an inactive state such that the SDT services may be supported.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
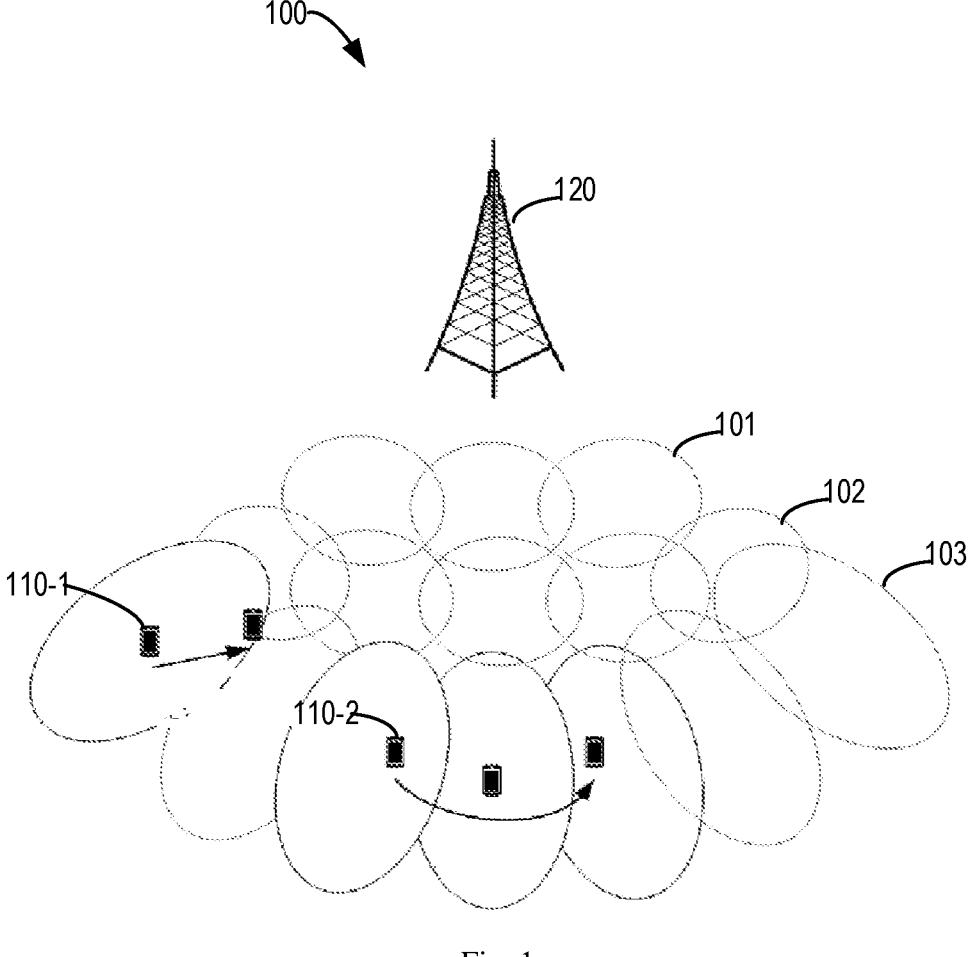
FIG. 1 illustrates an example communication system in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry), and (b) combinations of hardware circuits and software, such as (as applicable):

(i) a combination of analog and/or digital hardware circuit(s) with software/firmware, and (ii) any portions of hardware processor(s) with software (including digital signal processor(s), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto node, a pico node, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As stated above, it has been agreed to support SDT services for UEs in the inactive state. One routine for this end is a two-step or four-step Random Access Channel (RACH) based solution. The other routine for this end is to transmit UL data on pre-configured UL resources when the UE has a valid TA.

In NR, it is possible to configure UL transmissions without the need to transmit a dynamic grant in correspondence of each UL transmission occasion. The configuration of these UL resources, also referred to as Configured Grant (CG) Physical UL Shared Channel (PUSCH) resources, may be implemented by two possible schemes, i.e. via RRC (type1) or via a combination of RRC and PDCCH (addressed to CS-RNTI) (type2).

Furthermore, in NR, the TA adjustment is made in multiples of $16 \cdot 64 \cdot T_c/2^\mu$, where $T_c$ and $\mu$ are respectively the basic time unit for NR and the subcarrier spacing (SCS) configuration. The following Table 1 is an illustration of the TA adjusting step granularity and the spatial granularity for each subcarrier spacing, where it can be noted that the lower is the subcarrier spacing, the higher is the value of the spatial granularity. Taking $\mu=0$ as an example, the gNB only needs to adjust the TA timing of the UE when the UE moves more than about 78 m away from or towards the gNB due to the TA adjusting granularity.

TABLE 1

TA adjustment granularity in time and space

| μ | SCS [kHz] | TA Adjustment Step Granularity $(16 \cdot 64 \cdot T_c/2^\mu)$ [s] | Spatial granularity $(16 \cdot 64 \cdot T_c/2 \cdot c \cdot 2^\mu)$ [m] |
|---|---|---|---|
| 0 | 15 | 5.2083e−07 | 78.0705 |
| 1 | 30 | 2.6042e−07 | 39.0352 |
| 2 | 60 | 1.3021e−07 | 19.5176 |
| 3 | 120 | 6.5104e−08 | 9.7588 |
| 4 | 240 | 3.2552e−08 | 4.8794 |

The TA adjustment can take place both during the RACH procedure (via the Timing Advance Command which allows to address up to 3846 multiples of $16 \cdot 64 \cdot T_c/2^\mu$, where the goal is to advance in time the UEs UL transmissions) and during the normal operation of the UE in RRC Connected state (via the Timing Advance Command which allows to address up to 63 multiples of $16 \cdot 64 \cdot T_c/2^\mu$, where the goal is to perform fine adjustments in the UE's TA due to the UE's movement).

By introducing pre-configured CG resources for UEs in the inactive state, there may be a problem of validating whether the UE has a valid TA to enable the SDT services using the CG resources.

Even a TA timer may be introduced specifically for TA maintenance for the UE's SDT services on the CG resources, the TA timer by itself is not enough to validate whether the UE still has a valid TA. This is because the configured timer duration may not reflect the UE's mobility conditions and therefore the UE may become time mis-aligned before the TA timer expires. Also, the UE may be still time aligned even when the TA timer expires.

In NB-IOT's Preconfigured Uplink Resources (PUR), the TA validation was made based on Reference Signal Receiving Power (RSRP). That is, a first RSRP value is measured at the time a PUR transmission is to be made and a second RSRP value is measured at the time the UE has a valid TA (i.e., Reference RSRP). If the variation between the first RSRP value and the second RSRP value is above a configured delta increase/decrease threshold, the UE would deem that it no longer has a valid TA, and therefore cannot make the PUR transmission.

However, the same RSRP based TA validation criteria is not sufficient in NR, mainly due to the characteristics associated with the NR's beam-based operation. FIG. 1 illustrates an example communication system 100 in which example embodiments of the present disclosure may be implemented. The communication system 100 may include one or more terminal devices, such as a terminal device 110-1 and a terminal device 110-2 (hereinafter may also be referred to as a first device 110-1 and 110-2, or collectively called as a terminal device 110 or a first device 110), and one or more network devices, such as a network device 120 (hereinafter may also be referred to as a second device 120) which serves an area using different frequency bands in both DL and UL. Such a frequency band may also be referred to as an operating frequency band of the corresponding network device. The terminal device 110 is capable of connecting and communicating in the UL and DL with the network device 120 as long as the terminal device 110 being located within the corresponding cell. In the communication system 100, an UL refers to a link in a direction from a terminal device 110 to a network device 120, and a DL refers to a link in a direction from the network device 120 to the terminal device 110.

In FIG. 1, each ellipse may represent a Synchronization Signal Block (SSB) coverage projected to the ground, which may be regarded as a SSB beam projected by a SSB signal to the ground. It can be seen that depending on the distance from the network device 120, the SSB beams may have different radial coverages. For SSB beams such as SSB beams 101 in FIG. 1 near the network device 120, the radial coverages thereof are relatively small, which may also be referred to as inner SSB beams 101. On the other hand, for SSB beams such as SSB beams 103 in FIG. 1 far away from the network device 120, the radial coverages thereof are relatively large, which may also be referred to as outer SSB beams 103.

The SSB signal is a downlink reference signal used in NR and hereinafter, the present disclosure is described using the term of SSB for purposed of illustration. However, those skilled in the art may appreciate that the present disclosure is not limited to the specific terming but may cover other downlink reference signals developed or to be developed in the future.

As seen from FIG. 1, the terminal device 110-1 may move closer to the network device 120 within the same SSB beam, which may reduce the pathloss but will be farther away from the beamforming lobe (i.e. where the beamforming gain is the highest). In this case, the RSRP value of the terminal device 110-1 may be not varied, and thus the terminal device 110-1 cannot detect that the TA might no longer be valid. In contrast, the terminal device 110-2 may move between different SSB beams while maintaining the same distance from the network device. In this case, the terminal device 110-2 may observe a variation in the measured RSRP value while still having a valid TA.

In this regard, it is necessary to provide a solution for the terminal device 110 to validate its TA before performing the SDT using the CG resources to avoid TA misalignment.

According to embodiments of the present disclosure, there is providing a solution for supporting SDT services by the terminal network 110 in the inactive state, and more particularly, a solution for TA validation for the SDT services by the terminal network 110. In the solution, the network device 120 may configure TA validation configuration information for the terminal device 110's SDT in an inactive state. The TA validation configuration information may be carried in a RRC Release message with Suspend Configuration which may further include CG resource configuration for the terminal device 110's SDT, for example. The terminal device 110 may receive the TA validation configuration information and verify the TA validity of the terminal device 110 based at least on the TA validation configuration information. To ensure the SDT of the terminal device 110, three conditions should be fulfilled, i.e., the data volume to be transmitted via the SDT should be below a data volume threshold, the CG resource for the SDT should be configured and valid and the terminal device 110 should have a valid TA. To verify the TA validity of the terminal device 110, TA validation configuration information may be preconfigured by and received from the network device 120. Depending on the configuration of the TA validation configuration information, the present disclosure may provide several solutions as described below.

Principle and embodiments of the present disclosure will be described in detail below with reference to the accompanying drawings. However, it is to be understood that the accompanying drawings are given only for the purpose of illustration without suggesting any limitations. For example, in FIG. 1, the communication system 100 may include any suitable number of network devices 120 and terminal devices 110 adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
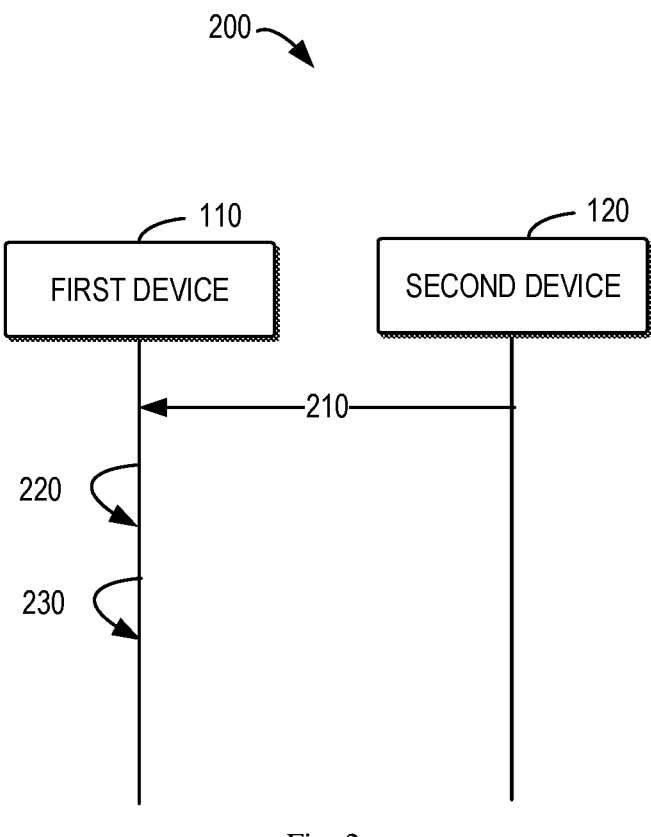
FIG. 2 illustrates a flowchart illustrating a process for performing TA validation according to some example embodiments of the present disclosure.

Reference is now made to FIG. 2, which shows a process 200 for performing TA validation according to some example embodiments of the present disclosure. For the purpose of discussion, the process 200 will be described with reference to FIG. 1. The process 200 may involve the terminal device 110 and the network device 120 as illustrated in FIG. 1. Hereinafter, the embodiments of the present disclosure are described by taking the terminal device 110 as the first device and the network device 120 as the second device as an example. However, those skilled in the art may understand that this does not intend to limit the scope of the present disclosure, and in some applicable cases, the first device and the second device may be used interchangeably.

In the process 200, at block 210, the first device 110 may receive TA validation configuration information for an inactive state of the first device 110 from a second device 120.

As stated above, depending on the distance from the network device 120, the SSB beams may have different radial coverages and thus movement of the first device 110 in different SSB beams may result in different impaction on TA variation. In this regard, the network device 120 may preconfigure different TA validation configuration information for SSB beams with different radial coverages and TA adjustment spatial granularities depending on cell's frame numerology u as listed in the above Table 1. In some embodiments, the second device 120 may use dedicated signalling or broadcast system information carrying such TA validation configuration information which may be in a form of a bitmap indicating for which SSB in a cell the TA validation may be skipped or even TA validation for all SSBs in the cell may be skipped.

In one embodiment, the TA validation configuration information may be included in a RRC Release message with Suspend Configuration. Upon receiving the RRC Release message, the first device 110 may transit from a RRC_CO-NNECTED state to a RRC_INACTIVE state while retaining a valid TA offset.

In one embodiment, the TA validation configuration information may be received together with a CG resource configuration indicating CG resources for SDTs of the first device 110. That is, the CG resource configuration may include a plurality of CG resources or occasions for SDTs so that the first device 110 may select one of them for a specific SDT. Furthermore, different CG resources may be preconfigured by the second device 120 for the SDTs of different first devices 110, and thus different CG resource configurations may be preconfigured and transmitted to different first devices 110.

At block 220, the first device 110 may select a CG resource to transmit a data packet to the second device 120 based on the CG resource configuration. As stated above, if there is data to be transmitted in a manner of SDT in the first device 110 in the inactive state, the data volume should be below a data volume threshold and the CG resource for the SDT should be configured and valid. Therefore, at block 220, the first device 110 should validate the data volume and available CG resources. In particular, the first device 110 may determine the data volume of the data packet to be transmitted, and determine whether the data volume is smaller than a data volume threshold associated with a CG resource preconfigured in the CG resource configuration by the second device. If the data volume is smaller than a data volume threshold associated with a CG resource, the first device 110 may select the CG resource to transmit the data packet.

At block 230, the first device 110 may verify, based at least on the TA validation configuration information received at block 210 and the CG resource selected at block 220, TA validity of the first device 110.

Although not shown in FIG. 2, the first device 110 may further transmit the data packet in different manners depending on the TA validity of the first device 110. In particular, if the first device 110 has successfully verified its TA validity at block 230, the first device 110 may certainly transmit the data packet using the CG resource selected at block 220. That is, the first device 110 may transmit the data packet through a SDT transmission to the second device 120.

On the other hand, if the first device 110 has failed to verify its TA validity at block 230, the first device 110 may transmit the data packet using conventional methods. For example, the first device 110 may transit to the RRC_CONNECTED state to transmit the data packet. For another example, the first device 110 may transmit the data packets using the above RACH based method.

As stated above, depending on the configuration of the TA validation configuration information, block 230 may be implemented in different manners as described in connection with FIG. 3 to FIG. 9 below.

Figure 3:
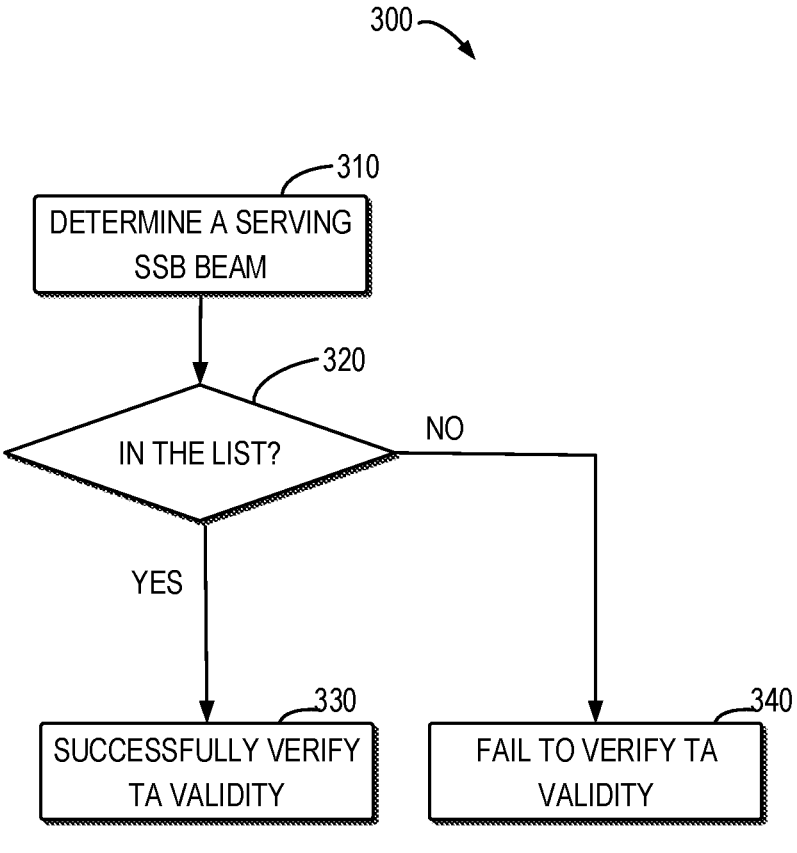
FIG. 3 illustrates a flowchart of an example method implemented at a first device in accordance with some example embodiments of the present disclosure.

FIG. 3 shows a flowchart of an example method 300 implemented at the first device 110 in accordance with some example embodiments of the present disclosure. Especially, the example method 300 may illustrate a further implementation of block 230 of FIG. 2, and other blocks, such as blocks 210 and 220, are omitted from FIG. 3 to make it concise.

Figure 4:
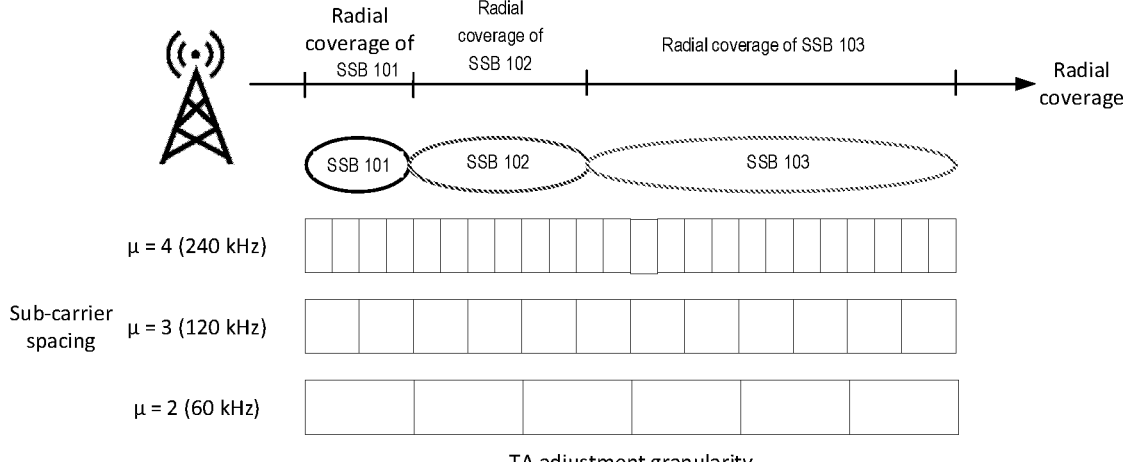
FIG. 4 illustrates an example schematic figure of the relationship between the SSB beams and the TA adjustment granularities depending on subcarrier spacing.

In the example method 300, the second device 120 may configure the TA validation configuration information to include a list of SSB beams associated with the CG resources for SDTs of the first device 110, hereinafter, also referred to as a first list of first SSB beams for purpose of description. If the first device 110 is in the coverage of one SSB beam among the list of SSB beams, the first device 110 may be regarded as always having a valid TA. FIG. 4 illustrates an example schematic figure of the relationship between the SSB beams and the TA adjustment granularities depending on subcarrier spacing. For example, as stated above and illustrated in FIGS. 1 and 4, the inner SSB beams 101 have typically smaller radial coverages and therefore, the first device 110 within the coverage of an inner SSB beam 101 may be considered as always having a valid TA regardless of its movement within that SSB beam for frame numerologies μ=2 and μ=3 (if it is assumed that the TA is valid at least within 2 units of TA adjustment granularity). In this regard, the second device 120 may configure the TA validation configuration information to include a list of the inner SSB beams 101. Furthermore, the second device 120 may configure the TA validation configuration information to include separate lists of SSB beams in which SSB beams in a same list have the same coverage radius towards the second device 120 while SSB beams in different lists have different coverage radius. The separate lists of SSB beams may be grouped based on the first device's serving beam at the time of acquiring a valid TA previously. For example, the SSB beams 101, 102 and 103 in FIG. 4 may form three separate lists of SSB beams according to their distances from the second device 120. Furthermore, different list of SSB beams may adopt different TA validation methods, as detailed hereinafter with reference to FIG. 10.

At block 310 of the method 300, the first device 110 may determine a serving SSB beam of the first device 110 corresponding to the CG resource selected at the above block 220. The CG resources configured by the second device 120 for the first device 110 may include information of the synchronization signal information for the first device 110, and thus the SSB beam may be determined from the selected CG resource, which is the serving SSB beam for the SDT.

At block 320 of the method 300, the first device 110 may determine whether the serving SSB beam of the first device 110 is included in the first list. For example, the first list of the first SSB beams may include a beam identifier (ID) for each first SSB beam and thus the first device 110 may compare the beam ID of the serving SSB beam with the beam IDs for the first SSB beams in the first list to determine whether the serving SSB beam is included in the first list.

If it is determination that the serving SSB beam of the first device 110 is included in the first list (YES at block 320), at block 330, the first device 110 may successfully verify TA validity of the first device 110. As stated above, the first list of SSB beams in the TA validation configuration information indicate those SSB beams in which the first device 110 may be considered as always having a valid TA such as the inner SSB beams 101 illustrated in FIG. 1.

On the other hand, if it is determined that the serving SSB beam of the first device 110 is not included in the first list (NO at block 320), at block 340, the first device 110 may fail to verify the TA validity of the first device 110.

Alternatively, if it is determined that the serving SSB beam of the first device 110 is not included in the first list (NO at block 320), instead of failing to verify the TA validity, the first device 110 may further determine whether its RSRP variation is within a beam specific RSRP variation threshold for the serving SSB beam or a predetermined RSRP variation threshold for all SSB beams in the list. If the first device 110 determines that its RSRP variation is within a beam specific RSRP variation threshold for the serving SSB beam or a predetermined RSRP variation threshold for all SSB beams in the list, it may also successfully verify the TA validity of the first device 110.

In this manner, the TA of the first device 110 may be simply validated for a predetermined list of SSB beams such as the inner SSB beams 101 as illustrated in FIG. 1.

In some variants of the method 300, in addition to the list of SSB beams associated with the CG resources for SDTs of the first device 110, the second device 120 may further configure the TA validation configuration information to include an infinite TAT (Timing Alignment Timer) value for some or all SSB beams in the first list. In this case, after determining that the serving SSB beam of the first device 110 is included in the first list (YES at block 320), at block 330, the first device 110 may further determine whether the serving SSB beam is associated with an infinite TAT value, and only if it is determined that the serving SSB beam is associated with an infinite TAT value, the first device 110 may successfully verify TA validity of the first device 110. That is, the first device 110 may determine that it has a valid TA based on not only the list of SSB beams but also an infinite TAT value for the SSB beams without waiting for the TAT expiring.

In some other variants of the method 300, in addition to the list of SSB beams associated with the CG resources for SDTs of the first device 110, the second device 120 may further configure the TA validation configuration information to include an infinite RSRP variation value for some or all SSB beams in the list. In this case, after determining that the serving SSB beam of the first device 110 is included in the first list (YES at block 320), at block 330, the first device 110 may further determine whether the serving SSB beam is associated with an infinite RSRP variation value, and only if it is determined that the serving SSB beam is associated with an infinite RSRP variation value, the first device 110 may successfully verify TA validity of the first device 110. That is, the first device 110 may determine that it has a valid TA based on not only the list of SSB beams but also the infinite RSRP variation value for the SSB beams without substantially determining the RSRP variation.

Figure 5:
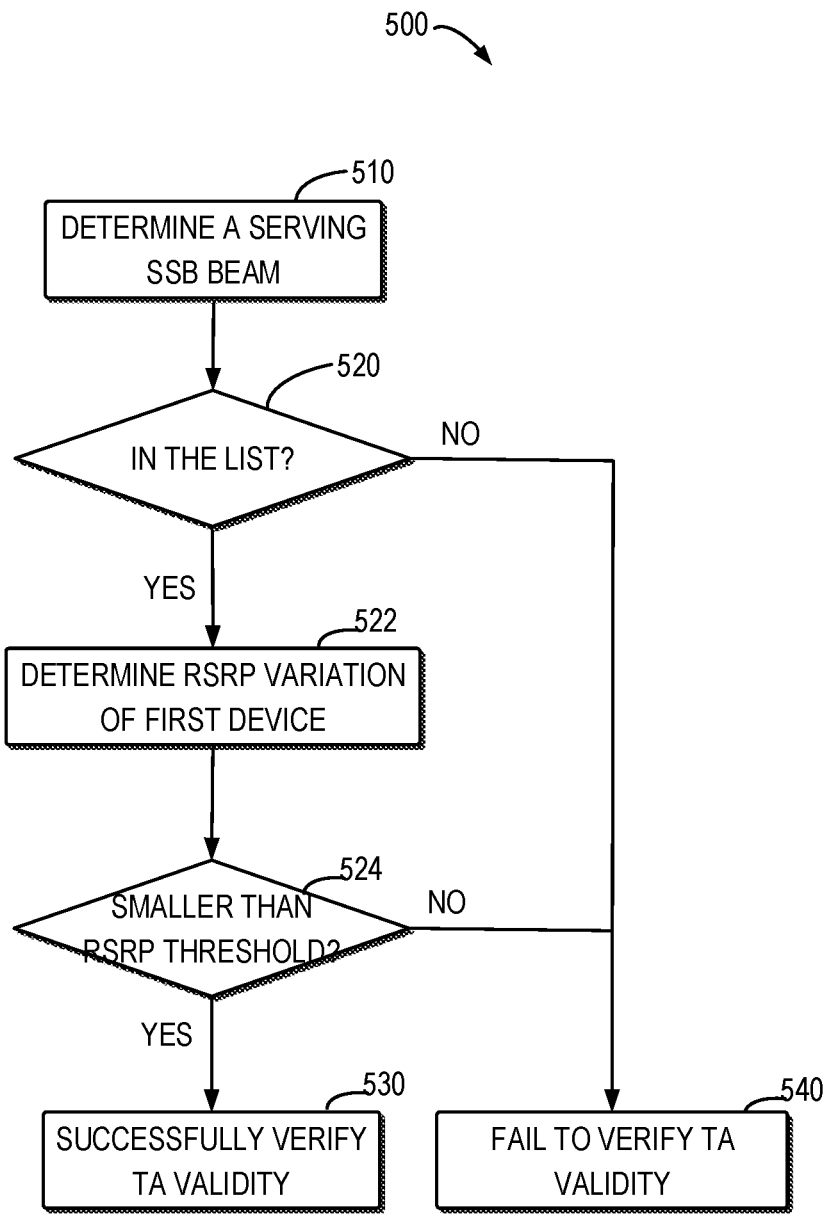
FIG. 5 illustrates a flowchart of another example method implemented at the first device in accordance with some other example embodiments of the present disclosure.

FIG. 5 shows a flowchart of another example method 500 implemented at the first device 110 in accordance with some other example embodiments of the present disclosure. Especially, the example method 500 may illustrate a further implementation of block 230 of FIG. 2, and other blocks, such as blocks 210 and 220, are omitted from FIG. 5 to make it concise. Furthermore, use of the similar reference numbers 510, 520, 530 and 540 indicate similar blocks 310, 320, 330 and 340 in FIG. 3.

In the example method 500, the second device 120 may also configure the TA validation configuration information to include a list of SSB beams associated with the CG resources for SDTs of the first device 110, hereinafter, also referred to as a second list of second SSB beams to distinguish from that in FIG. 3. In addition to the list of SSB beams, the second device 120 may further configure the TA validation configuration information to include a list of beam specific RSRP thresholds corresponding to the list of SSB beams or a predetermined RSRP threshold for all SSB beams in the list. That is, each SSB beam in the second list is associated with a specific RSRP threshold or all SSB beams in the list are associated with a same RSRP threshold, such that the TA validation of the first device 110 may be performed based on not only the serving SSB beam itself but also the RSRP variation threshold for the serving SSB beam. In particular, the specific RSRP threshold may be an increase threshold or decrease threshold compared with the RSRP value measured at the last time the first device 110 had a valid TA (i.e., reference RSRP). That is, the specific RSRP threshold for each SSB beam may be a threshold limiting RSRP variation of the first device 110 in that SSB beam.

Similar to the method 300, in the method 500, the second device 120 may configure the TA validation configuration information to include separate lists of SSB beams and further to include separate lists of beam specific RSRP thresholds for the separate lists of SSB beams, respectively or separate predetermined RSRP thresholds for separate lists of SSB beams. For example, the separate lists of SSB beams may include a list of inner SSB beams 101, a list of intermediate SSB beams 102 and a list of outer SSB beams 103, and the RSRP thresholds for the inner SSB beams 101 may be configured to be larger than those for the intermediate SSB beams 102 and the RSRP thresholds for the intermediate SSB beams 102 may be configured to be larger than those for the outer SSB beams 103.

At block 510 of the method 500, similar to block 310 of the method 300, the first device 110 may determine a serving SSB beam of the first device 110 corresponding to the CG resource selected at the above block 220.

At block 520 of the method 500, similar to block 320 of the method 300, the first device 110 may determine whether the serving SSB beam of the first device 110 is included in the second list. For example, the second list of the second SSB beams may include a beam ID for each second SSB beam and thus the first device 110 may compare the beam ID of the serving SSB beam with the beam IDs for the second SSB beams in the second list to determine whether the serving SSB beam is included in the second list.

If it is determination that the serving SSB beam of the first device 110 is included in the second list (YES at block 520), at block 522, the first device 110 may further determine the RSRP variation of the first device 110. In particular, the RSRP variation may be determined by measuring the RSRP value of the downlink reference signal such as the SSB signal of the first device 110 in the serving SSB beam and comparing the measured RSRP value with a reference RSRP value of the first device 110. Herein, the reference RSRP value may be measured at the last time the first device 110 had a valid TA.

At block 524, the first device 110 may determine whether the RSRP variation of the first device 110 is smaller than the beam specific RSRP threshold corresponding to the serving SSB beam or the predetermined RSRP threshold for all SSB beams. The beam specific RSRP threshold for the serving SSB beam may be searched from the list of beam specific RSRP thresholds indexed by SSB beam IDs, for example.

If it is determined that the RSRP variation of the first device 110 is smaller than the beam specific RSRP threshold corresponding to the serving SSB beam or the predetermined RSRP threshold for all SSB beams (YES at block 524), at block 530, similar to block 330 of the method 300, the first device 110 may successfully verify TA validity of the first device 110.

On the other hand, if it is determined that the serving SSB beam of the first device 110 is not included in the second list (NO at block 520) or if it is determined that the RSRP variation of the first device 110 is not smaller than the RSRP threshold corresponding to the serving SSB beam or the predetermined RSRP threshold for all SSB beams (NO at block 524), at block 540, similar to block 340 of the method 300, the first device 110 may fail to verify the TA validity of the first device 110.

In this manner, the TA of the first device 110 may be validated for the determined serving SSB beam for SDT of the first device depending on the RSRP variation of first device in the serving SSB beam and the beam specific RSRP threshold for the serving SSB beam or the predetermined RSRP threshold for all SSB beams.

In some variants of the method 500, instead of a beam specific RSRP threshold, the second device 120 may configure the TA validation configuration information to include a beam specific TAT value for each SSB beam or a predetermined TAT value for all SSB beams. In this case, at block 522, the first device may check its TAT value instead and determine at block 524 whether TAT value of the first device 110 is within the beam specific TAT value of the serving SSB beam or within the predetermined TAT value for all SSB beams, and if it is determined at block 524 that the TAT value of the first device 110 is within the beam specific TAT value of the serving SSB beam or within the predetermined TAT value for all SSB beams, the first device 110 may successfully verify TA validity of the first device 110 at block 530.

In some variants of the method 500, in addition to a beam specific RSRP threshold, the second device 120 may configure the TA validation configuration information to include a beam specific TAT value for each SSB beam or a predetermined TAT value for all SSB beams. In this case, if it is determined at block 524 that RSRP variation of the first device 110 is smaller than the RSRP threshold of the serving SSB beam (YES at block 524), the first device 110 may further check its TAT value and determine whether TAT value of the first device 110 is within the beam specific TAT value of the serving SSB beam or within the predetermined TAT value for all SSB beams (not shown in FIG. 5). If it is determined that the TAT value of the first device 110 is within the beam specific TAT value of the serving SSB beam or within the predetermined TAT value for all SSB beams, the first device 110 may successfully verify TA validity of the first device 110 at block 530.

Figure 6:
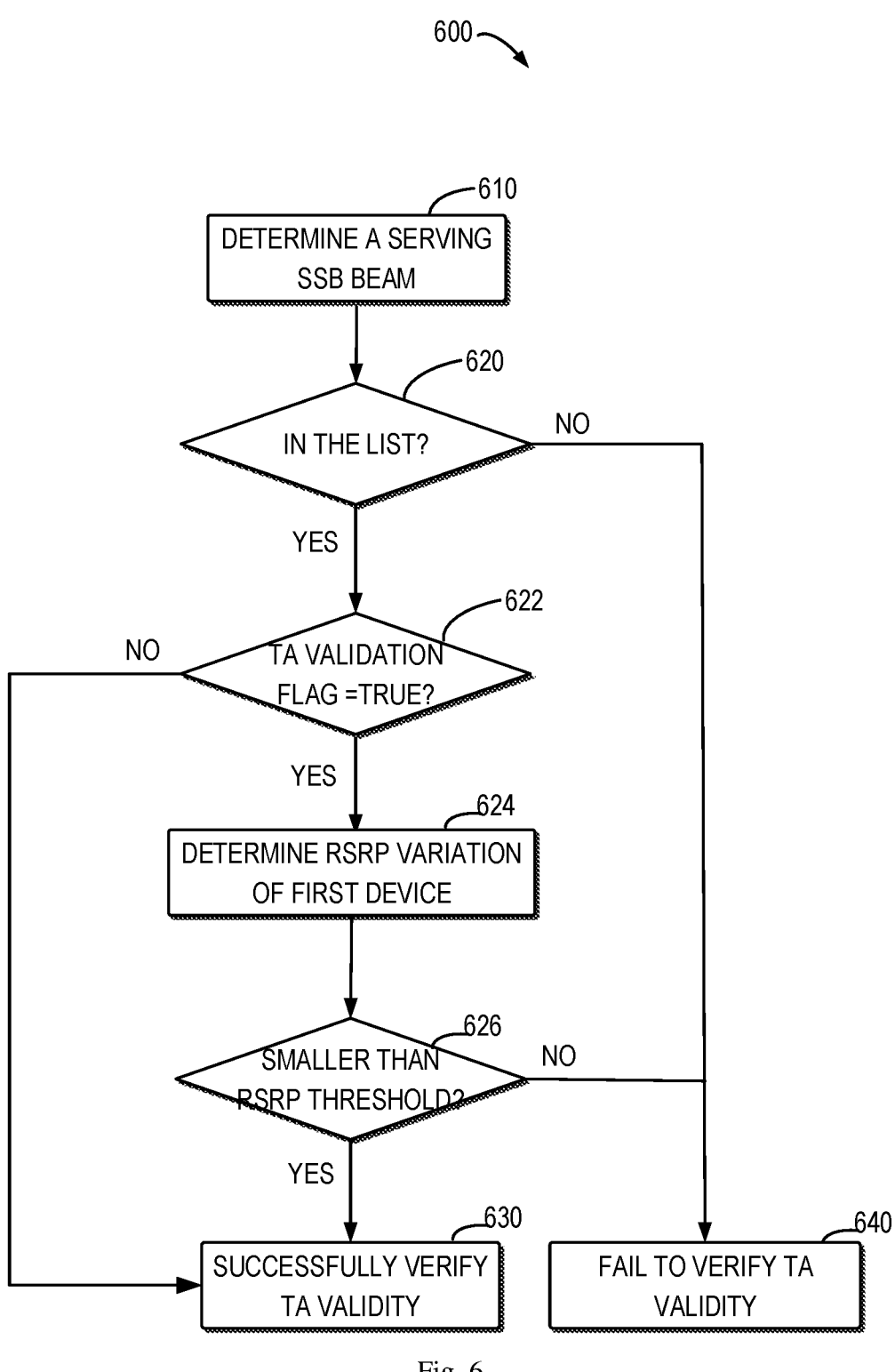
FIG. 6 shows a flowchart of a further example method implemented at the first device in accordance with some other example embodiments of the present disclosure.

FIG. 6 shows a flowchart of a further example method 600 implemented at the first device 110 in accordance with some other example embodiments of the present disclosure. Especially, the example method 600 may illustrate a further implementation of block 230 of FIG. 2, and other blocks, such as blocks 210 and 220, are omitted from FIG. 6 to make it concise. Furthermore, use of the similar reference numbers 610, 620, 630 and 640 indicate similar blocks 310, 320, 330 and 340 in FIG. 3 and blocks 510, 520, 530 and 540 in FIG. 5.

In the example method 600, similar to the method 500, the second device 120 may also configure the TA validation configuration information to include a list of SSB beams associated with the CG resources for SDTs of the first device 110. In the method 600, the second device 120 may further configure the TA validation configuration information to include a list of TA validation flags for the list of SSB beams. That is, each SSB beam in the list is associated with a specific TA validation flag indicating whether a TA validation is necessary or not for that SSB beam. In this case, the TA validation of the first device 110 may be performed based on not only the serving SSB beam itself but also the TA validation flag for the serving SSB beam. Furthermore, for those SSB beams with positive TA validation flags indicating a necessary TA validation, the TA validation configuration information may further include a list of beam specific RSRP thresholds or a single predetermined RSRP threshold for those SSB beams to perform the TA validation. That is, all SSB beams with positive TA validation flags are associated with a beam specific RSRP threshold specific to that SSB beam or a predetermined RSRP threshold for all SSB beams.

Similar to the method 300 or 500, in the method 600, the second device 120 may configure the TA validation configuration information to include separate lists of SSB beams, separate lists of TA validation flags for the separate lists of SSB beams and separate lists of beam specific RSRP thresholds for the SSB beams with positive TA validation flags, respectively or separate predetermined RSRP thresholds for separate lists. For example, the separate lists of SSB beams may include a list of inner SSB beams 101, a list of intermediate SSB beams 102 and a list of outer SSB beams 103, and the RSRP thresholds for the inner SSB beams 101 with positive TA validation flags may be configured to be larger than those for the intermediate SSB beams 102 with positive TA validation flags and the RSRP thresholds for the intermediate SSB beams 102 with positive TA validation flags may be configured to be larger than those for the outer SSB beams 103 with positive TA validation flags.

At block 610 of the method 600, similar to block 310 of the method 300, the first device 110 may determine a serving SSB beam of the first device 110 corresponding to the CG resource selected at the above block 220.

At block 620 of the method 600, similar to block 320 of the method 300, the first device 110 may determine whether the serving SSB beam of the first device 110 is included in the list of SSB beams. For example, the list of SSB beams may include a beam ID for each SSB beam and thus the first device 110 may compare the beam ID of the serving SSB beam with the beam IDs for the SSB beams in the list to determine whether the serving SSB beam is included in the list.

If it is determination that the serving SSB beam of the first device 110 is included in the list (YES at block 620), at block 622, the first device 110 may further determine whether the TA validation flag for the serving SSB beam indicates a TA validation is necessary. For example, the TA validation flag may be set to '1' to indicate that the TA validation is necessary and to '0' to indicate that the TA validation is not necessary.

If it is determined that the TA validation flag for the serving SSB beam indicates that the TA validation is necessary (YES at block 622), at block 624, the first device 110 may determine the RSRP variation of the first device 110. Similar to block 522 of the method 500, the RSRP variation may be determined by measuring the RSRP value of the synchronization signal of the first device 110 in the serving SSB beam and comparing the measured RSRP value with a reference RSRP value of the first device 110. Herein, the reference RSRP value may be measured at the last time the first device 110 had a valid TA.

At block 626, similar to block 524 of the method 500, the first device 110 may determine whether the RSRP variation of the first device 110 is smaller than the beam specific RSRP threshold corresponding to the serving SSB beam or the predetermined RSRP threshold for all SSB beams. The beam specific RSRP threshold for the serving SSB beam may be searched from the list of beam specific RSRP thresholds that are preconfigured by the second device 120 for the SSB beams with positive TA validation flags, as stated above.

If it is determined that the RSRP variation of the first device 110 is smaller than the beam specific RSRP threshold corresponding to the serving SSB beam or the predetermined RSRP threshold for all SSB beams (YES at block 626), at block 630, similar to block 330 of the method 300 and block 530 of the method 500, the first device 110 may successfully verify TA validity of the first device 110.

In some embodiments, if it is determined that the TA validation flag for the serving SSB beam indicates that the TA validation is not necessary (NO at block 622), the method 600 may go to block 630 directly to successfully verify TA validity of the first device 110. In this case, the positive TA validation flag may indicate a mandatory RSRP-based TA validation, similar to the method 500, while the negative TA validation flag may indicate an always valid TA without any further validation operation, similar to the method 300.

On the other hand, if it is determined that the serving SSB beam of the first device 110 is not included in the list (NO at block 620) or if it is determined that the RSRP variation of the first device 110 is not smaller than the RSRP threshold corresponding to the serving SSB beam or not smaller than the predetermined RSRP threshold for all SSB beams (NO at block 626), at block 640, similar to block 340 of the method 300 and block 540 of the method 500, the first device 110 may fail to verify the TA validity of the first device 110.

In this manner, the TA of the first device 110 may be more flexibly validated for the determined serving SSB beam.

In some variants of the method 600, instead of the RSRP variation, the second device 120 may further configure the TA validation configuration information to include a beam specific TAT value for each SSB beam or a predetermined TAT value for all SSB beams. In this case, after determining that the TA validation flag for the serving SSB beam indicates that a TA validation is necessary (YES at block 622), at block 624, the first device 110 may further check its TAT value instead and determine at block 626 whether the TAT value of the first device 110 is within the beam specific TAT value of the serving SSB beam or within the predetermined TAT value for all SSB beams, and if it is determined that the TAT value of the first device 110 is within the beam specific TAT value of the serving SSB beam or within the predetermined TAT value for all SSB beams, the first device 110 may successfully verify TA validity of the first device 110 at block 630.

In some other variants of the method 600, in addition to the RSRP variation, the second device 120 may further configure the TA validation configuration information to include a beam specific TAT value for each SSB beam or a predetermined TAT value for all SSB beams. In this case, if it is determined at block 626 that RSRP variation of the first device 110 is smaller than the RSRP threshold of the serving SSB beam (YES at block 626), the first device 110 may further check its TAT value and determine whether TAT value of the first device 110 is within the beam specific TAT value of the serving SSB beam or within the predetermined TAT value for all SSB beams (not shown in FIG. 6), and if it is determined that the TAT value of the first device 110 is within the beam specific TAT value of the serving SSB beam or within the predetermined TAT value for all SSB beams, the first device 110 may successfully verify TA validity of the first device 110 at block 630.

In the above, depending on the contents of the TA validation configuration information, the methods 300, 500 and 600 are described to detail how the TA validation is performed by the first device 110. In some further embodiments, the first device 110 may be within coverages of different SSB beams using different TA validation methods, and thus the methods 300, 500 and 600 may be implemented in combination to perform the TA validation. For example, at least two lists of SSB beams may be preconfigured in the TA validation configuration information and different TA validation methods such as the method 300, 500 or 600 may be performed for different lists of SSB beams. Furthermore, which TA validation method is performed for a specific list of SSB beams may also be preconfigured by the second device 120 through the TA validation configuration information or other separate signaling.

Figure 7:
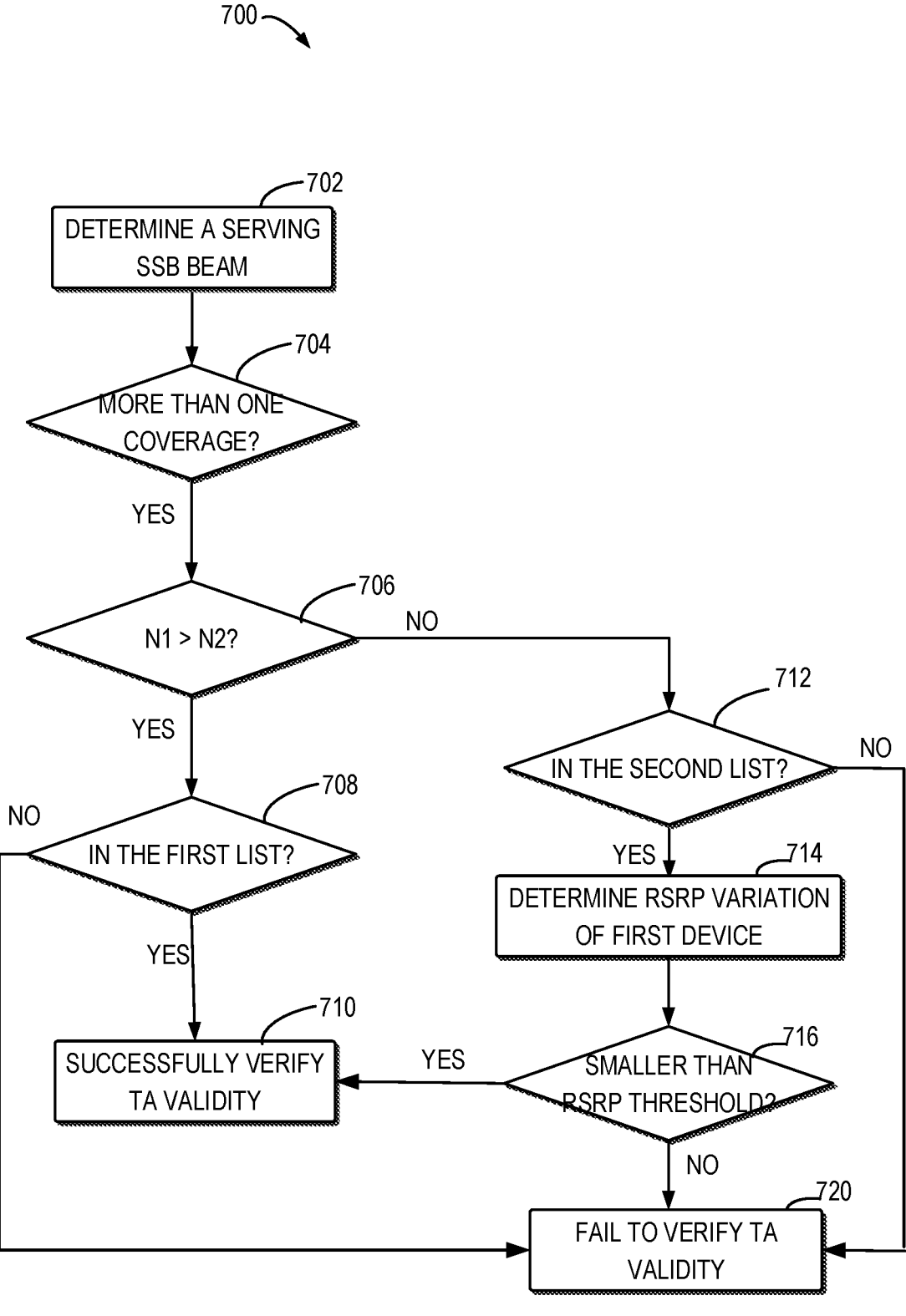
FIG. 7 shows a flowchart of a further example method implemented at the first device in accordance with some other example embodiments of the present disclosure.

FIG. 7 shows a flowchart of a further example method 700 implemented at the first device 110 in accordance with some other example embodiments of the present disclosure. Especially, the example method 700 may illustrate a further implementation of block 230 of FIG. 2, and other blocks, such as blocks 210 and 220, are omitted from FIG. 7 to make it concise. The method 700 may be considered to be a combination of the method 300 and the method 500, and for a serving SSB beam, the TA validation may be performed using that for the preponderant SSB beams.

In the example method 700, the second device 120 may configure the TA validation configuration information to include a first list of first SSB beams associated with a first group of CG resources (similar to the list of SSB beams in the method 300 that indicate an always valid TA), a second list of second SSB beams associated with a second group of CG resources and a list of beam specific RSRP thresholds corresponding to the second list or a predetermined RSRP threshold for all SSB beams in the second list (similar to the list of SSB beams and the list of beam specific RSRP thresholds or the predetermined RSRP threshold in the method 500 that indicate that the TA validation should be performed based on the beam specific RSRP threshold corresponding to the serving SSB beam or the predetermined RSRP threshold for all SSB beams).

At block 702 of the method 700, the first device 110 may determine a serving SSB beam of the first device 110 corresponding to the CG resource selected at block 220.

At block 704, the first device 110 may determine that the first device 110 is in coverage of both at least one first SSB beam of the first list and at least one second SSB beam of the second list. That is, the first device 110 is within a coverage of different SSB beams using different TA validation methods.

At block 706, the first device 110 may determining whether a first number N1 of the at least one first SSB beam is larger than a second number N2 of the at least one second SSB beam.

If it is determined that the first number N1 is larger than the second number N2 (YES at block 706), i.e., the first SSB beams are the preponderant SSB beams, at block 708, the first device 110 may determine whether the serving SSB beam of the first device 110 is included in the first list.

If it is determined that the serving SSB beam of the first device 110 is included in the first list (YES at block 708), at block 710, the first device 110 may successfully verify TA validity of the first device 110. That is, a serving SSB beam in the first list may indicate an always valid TA.

On the other hand, if it is determined that the first number N1 is not larger than the second number N2 (NO at block 706), i.e., the second SSB beams are the preponderant SSB beams, at block 712, the first device 110 may determine whether the serving SSB beam of the first device 110 is included in the second list.

If it is determined that the serving SSB beam of the first device is included in the second list (YES at block 712), at block 714, the first device 110 may further determine a RSRP variation of the first device 110.

At block 716, the first device 110 may further determine whether the RSRP variation of the first device 110 is smaller than a beam specific RSRP threshold corresponding to the serving SSB beam or a predetermined RSRP threshold for all SSB beams.

If it is determined that the RSRP variation of the first device 110 is smaller than the beam specific RSRP threshold corresponding to the serving SSB beam or the predetermined RSRP threshold for all SSB beams, the method 700 may go to block 710 to successfully verify TA validity of the first device 110.

On the other hand, if it is determined that the serving SSB beam of the first device 110 is not included in the first list (NO at block 708) or the second list (NO at block 712) or that the RSRP variation of the first device 110 is not smaller than the RSRP threshold corresponding to the serving SSB beam or the predetermined RSRP threshold for all SSB beams (NO at block 716), the first device 110 may fail to verify the TA validity of the first device 110 at block 720.

It can be seen that, in the method 700, the TA validation may be performed depending on the preponderant SSB beams in which coverage the first device 110 is located. That is, if the SSB beams in the first list is preponderant, the TA validation method of the first list such as the method 300 is used, while if the SSB beams in the second list is preponderant, the TA validation method of the second list such as the method 500 is used. In this regard, the block 708 is similar to the block 320 of the method 300 and the blocks 712, 714, and 716 are similar to the blocks 520, 522, and 524 of the method 500.

Figure 8:
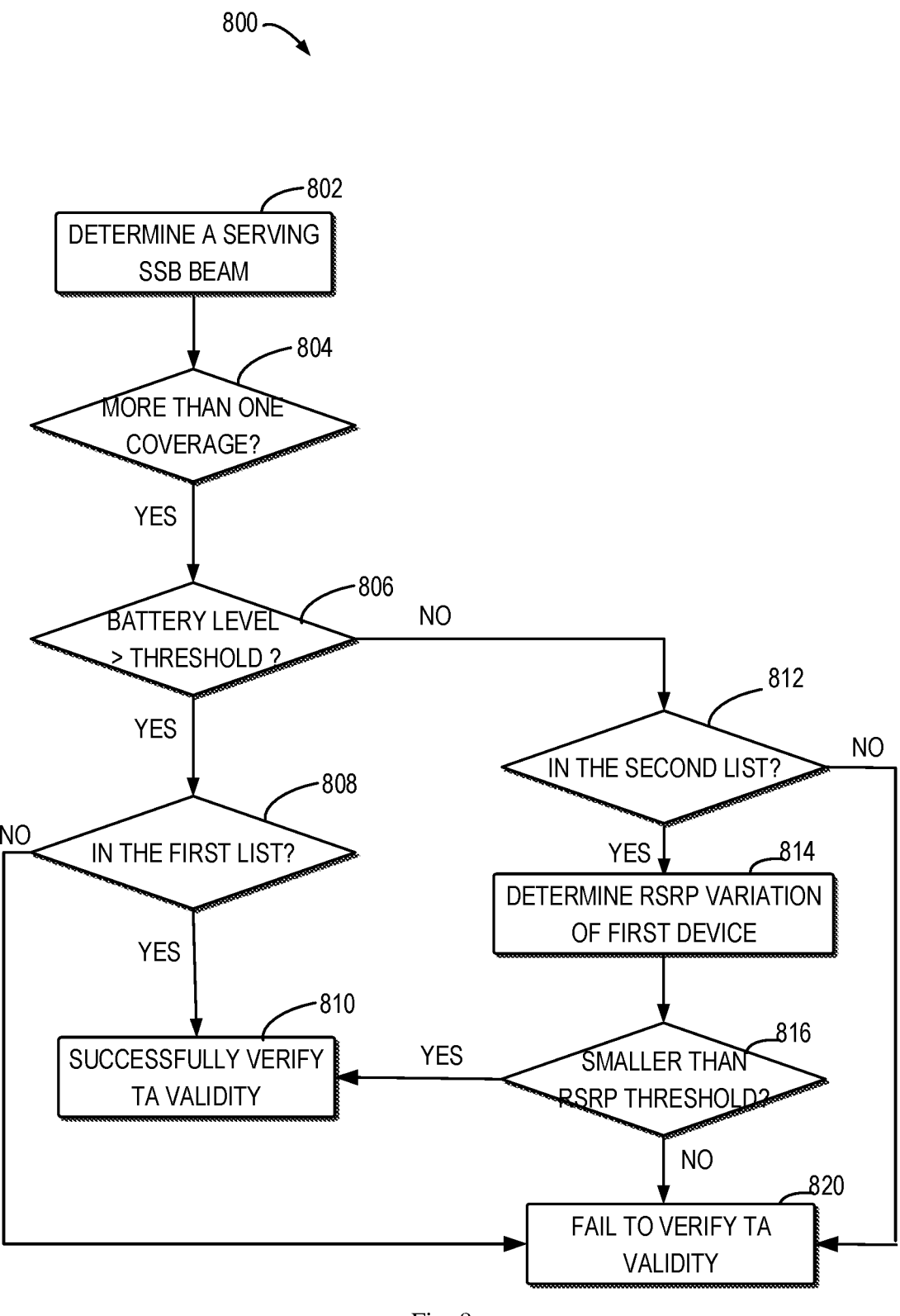
FIG. 8 shows a flowchart of a further example method implemented at the first device in accordance with some other example embodiments of the present disclosure.

FIG. 8 shows a flowchart of a further example method 800 implemented at the first device 110 in accordance with some other example embodiments of the present disclosure. Especially, the example method 800 may illustrate a further implementation of block 230 of FIG. 2, and other blocks, such as blocks 210 and 220, are omitted from FIG. 8 to make it concise. Similar to the method 700, the method 800 may be considered to be another combination of the method 300 and the method 500, and for a serving SSB beam, the TA validation may be performed depending on the battery level of the first device 110.

In the example method 800, the second device 120 may configure the TA validation configuration information to include a first list of first SSB beams associated with a first group of CG resources (similar to the list of SSB beams in the method 300 that indicate an always valid TA), a second list of second SSB beams associated with a second group of CG resources and a list of beam specific RSRP thresholds corresponding to the second list or a predetermined RSRP threshold for all SSB beams in the second list (similar to the list of SSB beams and the list of beam specific RSRP thresholds or the predetermined RSRP threshold in the method 500 that indicate that the TA validation should be performed based on the beam specific RSRP threshold corresponding to the serving SSB beam or the predetermined RSRP threshold for all SSB beams).

At block 802 of the method 800, the first device 110 may determine a serving SSB beam of the first device 110 corresponding to the CG resource selected at block 220.

At block 804, the first device 110 may determine that the first device 110 is in coverage of both at least one first SSB beam of the first list and at least one second SSB beam of the second list. That is, the first device 110 is within a coverage of different SSB beams using different TA validation methods.

At block 806, the first device 110 may determine whether a battery level of the first device 110 is larger than a predetermined battery threshold. Herein, the predetermined battery threshold may be preconfigured by the second device 120 or determined by the first device 110 itself.

If it is determined that the battery level of the first device 110 is larger than the predetermined battery threshold (YES at block 806), at block 808, the first device 110 may determine whether the serving SSB beam of the first device 110 is included in the first list.

If it is determined that the serving SSB beam of the first device 110 is included in the first list (YES at block 808), at block 810, the first device 110 may successfully verify TA validity of the first device 110. That is, a serving SSB beam in the first list may indicate an always valid TA.

On the other hand, if it is determined that the battery level of the first device 110 is not larger than the predetermined battery threshold (NO at block 806), at block 812, the first device 110 may determine whether the serving SSB beam of the first device 110 is included in the second list.

If it is determined that the serving SSB beam of the first device is included in the second list (YES at block 812), at block 814, the first device 110 may further determine a RSRP variation of the first device 110.

At block 816, the first device 110 may further determine whether the RSRP variation of the first device 110 is smaller than a beam specific RSRP threshold corresponding to the serving SSB beam or a predetermined RSRP threshold for all SSB beams.

If it is determined that the RSRP variation of the first device 110 is smaller than the RSRP threshold corresponding to the serving SSB beam or a predetermined RSRP threshold for all SSB beams, the method 800 may go to block 810 to successfully verify TA validity of the first device 110.

On the other hand, if it is determined that the serving SSB beam of the first device 110 is not included in the first list (NO at block 808) or the second list (NO at block 812) or that the RSRP variation of the first device 110 is not smaller than the RSRP threshold corresponding to the serving SSB beam or the predetermined RSRP threshold for all SSB beams (NO at block 816), the first device 110 may fail to verify the TA validity of the first device 110 at block 820.

It can be seen that, in the method 800, the TA validation may be performed depending on the battery level of the first device 110. That is, if the battery level is low, a more conservative TA validation method such as the method 500 is used, while if the battery level is high, a less conservative TA validation method such as the method 300 is used. In this regard, the block 808 is similar to the block 320 of the method 300 and the blocks 812, 814, and 816 are similar to the blocks 520, 522, and 524 of the method 500.

In some further embodiments, for the first device 110 within coverages of more than one SSB beam, the TA validation may be performed according to the method 500 with different beam specific RSRP thresholds depending on the battery levels of the first device 110.

Figure 9:
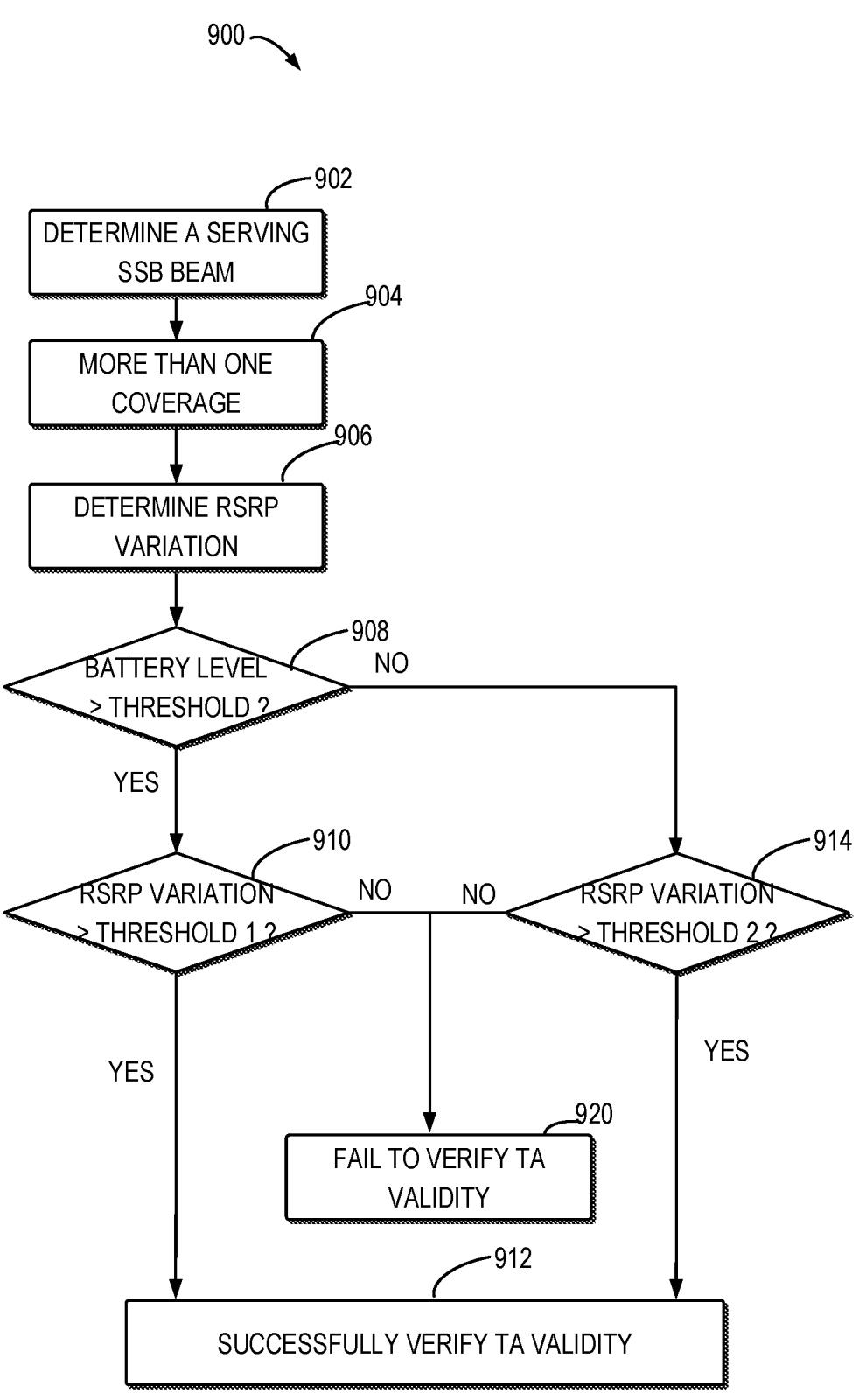
FIG. 9 shows a flowchart of a further example method implemented at the first device in accordance with some other example embodiments of the present disclosure.

FIG. 9 shows a flowchart of a further example method 900 implemented at the first device 110 in accordance with some other example embodiments of the present disclosure. Especially, the example method 900 may illustrate a further implementation of block 230 of FIG. 2, and other blocks, such as blocks 210 and 220, are omitted from FIG. 9 to make it concise. The method 900 may be considered to be an improvement to the method 500 in FIG. 5, in which different RSRP thresholds may be adopted to perform the TA validation depending on the battery level of the first device 110.

In the example method 900, the second device 120 may configure the TA validation configuration information to include a list of SSB beams associated with CG resources and a list of beam specific RSRP thresholds in which at least two beam specific RSRP thresholds are corresponding to each SSB beam of the list of SSB beams. That is, for each SSB beam, at least two beam specific RSRP thresholds may be preconfigured for selection depending on the battery level of the first device 110.

At block 902 of the method 900, the first device 110 may determine a serving SSB beam of the first device 110 corresponding to the CG resource selected at block 220.

At block 904, the first device 110 may determine that the first device 110 is in coverage of at least two SSB beams of the list of SSB beams.

If it is determined that the first device 110 is in coverage of at least two SSB beams of the list of SSB beams, at block 906, the first device 110 may determine a RSRP variation of the first device 110.

At block 908, the first device 110 may determine whether a battery level of the first device 110 is larger than a predetermined battery threshold. Herein, the predetermined battery threshold may be preconfigured by the second device 120 or determined by the first device 110 itself.

If it is determined that the battery level of the first device 110 is larger than the predetermined battery threshold (YES at block 908), at block 910, the first device 110 may determine whether the RSRP variation of the first device 110 determined at block 906 is larger than a first RSRP threshold corresponding to the serving SSB beam.

If it is determined that the RSRP variation of the first device 110 is larger than the first RSRP threshold (YES at block 910), at block 912, the first device 110 may successfully verify TA validity of the first device 110.

On the other hand, if it is determined that the battery level of the first device 110 is not larger than the predetermined battery threshold (NO at block 908), at block 914, the first device 110 may determine whether the RSRP variation of the first device 110 is larger than a second RSRP threshold corresponding to the serving SSB beam, wherein the second RSRP threshold is smaller than the first RSRP threshold.

If it is determined that the RSRP variation of the first device 110 is larger than the second RSRP threshold (YES at block 914), the method 900 goes to block 912 to successfully verify TA validity of the first device 110.

On the other hand, if it is determined that the RSRP variation of the first device is neither larger than the first RSRP threshold (NO at block 910) nor the second RSRP threshold (NO at block 914), the first device 110 may fail to verify the TA validity of the first device 110 at block 920.

It can be seen that, in the method 900, the TA validation may be performed depending on the battery level of the first device 110 is. That is, if the battery level is low, a more conservative RSRP threshold is used, while if the battery level is high, a less conservative RSRP threshold is used.

Figure 10:
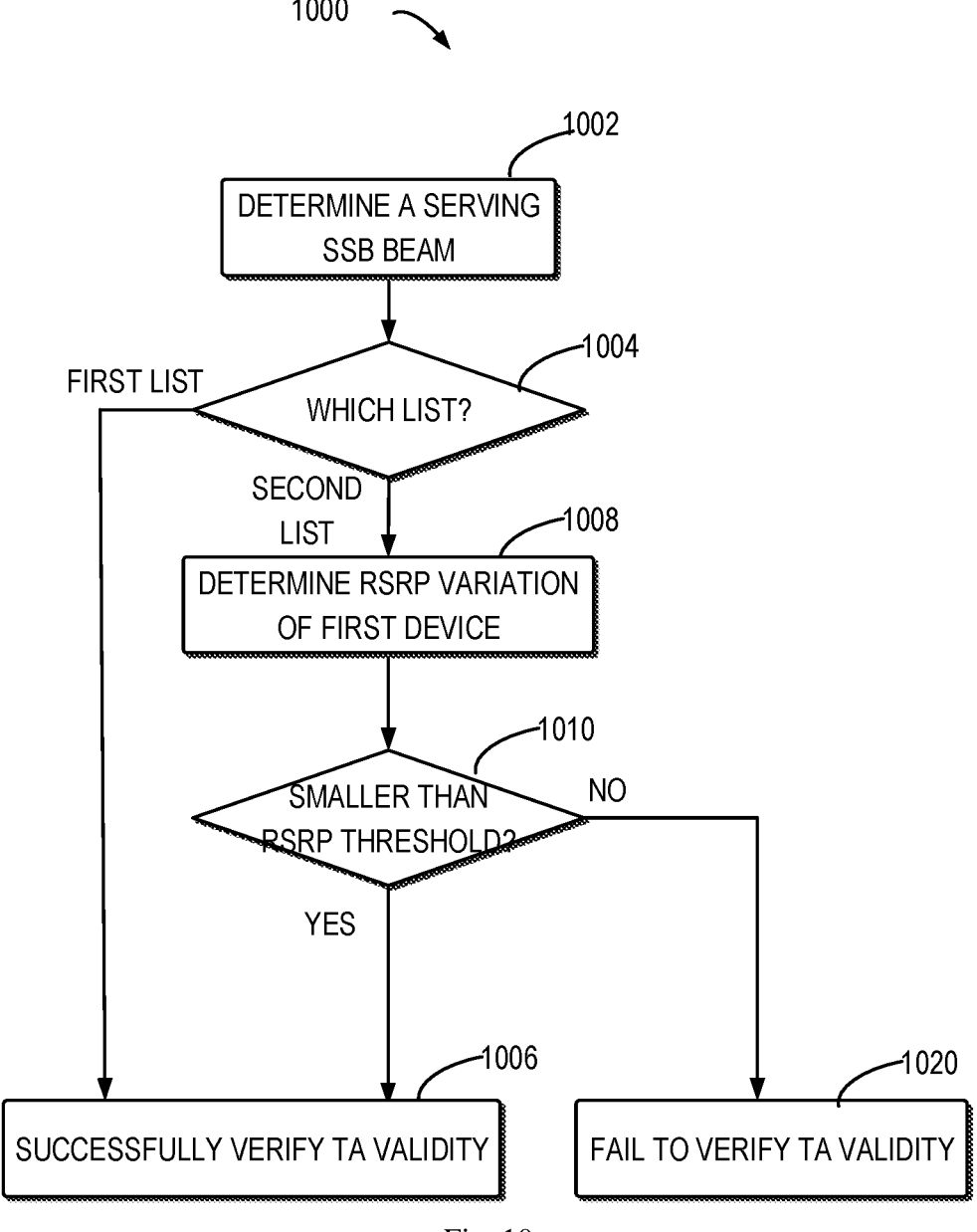
FIG. 10 shows a flowchart of a further example method implemented at the first device in accordance with some other example embodiments of the present disclosure.

FIG. 10 shows a flowchart of a further example method 1000 implemented at the first device 110 in accordance with some other example embodiments of the present disclosure. Especially, the example method 1000 may illustrate a further implementation of block 230 of FIG. 2, and other blocks, such as blocks 210 and 220, are omitted from FIG. 10 to make it concise. The method 1000 may be considered to be an improvement to the method 300 in FIG. 3, in which at least two lists of SSB beams may be included in the TA validation configuration information and different TA validation methods may be adopted for different lists of SSB beams to perform the TA validation.

In the example method 1000, the second device 120 may configure the TA validation configuration information to include a first list of first SSB beams associated with a first group of CG resources, and a second list of second SSB beams associated with a second group of CG resources and a list of beam specific RSRP thresholds corresponding to the second list or a predetermined RSRP threshold for all SSB beams in the second list. For the first list of SSB beams, the TA validation method may follow the method 300, and for the second list of SSB beams, the TA validation method may follow the method 500. That is, the serving SSB beam in the first list may be regarded as always having a valid TA, and the serving SSB beam in the second list should be verified based on its RSRP variation.

In one implementation, respective lists of SSB beams may be grouped depending on the coverage radius towards the second device 120 and the first device 110's serving beam at the time of acquiring a valid TA previously. For example, the SSB beams 101, 102 and 103 in FIG. 4 may form three separate lists of SSB beams according to their distances from the second device 120.

At block 1002 of the method 1000, the first device 110 may determine a serving SSB beam of the first device 110 corresponding to the CG resource selected at block 220.

At block 1004, the first device 110 may determine whether the serving SSB beam of the first device 110 is included in the first list or the second list.

If it is determined at block 1004 that the first device 110 is included in the first list of SSB beams, at block 1006, the first device 110 may successfully verify the TA validity of the first device 110. That is, the serving SSB beam in the first list will always ensure that the first device 110 has a valid TA.

In some variants, the TA validation configuration information may further or instead include an infinite TAT value for some or all the SSB beams in the list. In this case, between blocks 1004 and 1006, the first device 110 may further determine whether the serving SSB beam is associated with an infinite TAT value, and if it is determined that the serving SSB beam is associated with an infinite TAT value, the first device 110 may successfully verify TA validity of the first device 110 at block 1006.

Alternatively or additionally, the TA validation configuration information may further or instead includes an infinite RSRP variation value for some or all the SSB beams in the list. In this case, between blocks 1004 and 1006, the first device 110 may further determine whether the serving SSB beam is associated with the infinite RSRP variation value, and if it is determined that the serving SSB beam is associated with the infinite RSRP variation value, the first device 110 may successfully verify TA validity of the first device 110 at block 1006.

If it is determined at block 1004 that the first device 110 is included in the second list of SSB beams, at block 1008, the first device 110 may determine a RSRP variation of the first device and then at block 1010, the first device 110 may determine whether the RSRP variation of the first device is smaller than a beam specific RSRP threshold among the list of beam specific RSRP thresholds corresponding to the serving SSB beam or a predetermined RSRP threshold for all SSB beams in the second list.

If it is determined that the RSRP variation of the first device is smaller than a RSRP threshold among the list of beam specific RSRP thresholds corresponding to the serving SSB beam or the predetermined RSRP threshold for all SSB beams in the second list (YES at block 1010), the method 1000 goes to block 1006, in which the first device 110 may successfully verify the TA validity of the first device 110.

In some variants, the TA validation configuration information may further or instead include an infinite TAT value for some or all the SSB beams in the first list. In this case, between blocks 1010 and 1006, the first device 110 may further determine whether the serving SSB beam is associated with the infinite TAT value, and if it is determined that the serving SSB beam is associated with the infinite TAT value, the first device 110 may successfully verify TA validity of the first device 110 at block 1006.

On the other hand, if it is determined that the RSRP variation of the first device is not smaller than a RSRP threshold among the list of beam specific RSRP thresholds corresponding to the serving SSB beam (NO at block 1010), the first device 110 may fail to verify the TA validity of the first device 110 at block 1020.

It can be seen that, in the method 1000, the TA validation may be performed differently for a serving SSB beam in different lists of SSB beams such that more flexible TA validation may be achieved.

In some example embodiments, an apparatus is provided capable of performing any of the methods 300, and 500 to 1000. The apparatus may include means for receiving TA validation configuration information associated with one or more downlink reference beams for an inactive state of a first device from a second device, means for selecting a CG resource to transmit a data packet to the second device based on a CG resource configuration for small data transmissions of the first device, and means for verifying, based at least on the TA validation configuration information and the selected CG resource, TA validity of the first device. The means may be implemented in any suitable form. For example, the means may be implemented in a circuitry or software module.

In some example embodiments, the means for receiving comprises means for receiving a RRC Release message with suspend configuration including the TA validation configuration information.

In these example embodiments, the means for receiving comprises means for receiving the TA validation configuration information together with the CG resource configuration indicating CG resources for small data transmissions of the first device.

In some example embodiments, the TA validation configuration information further includes beam specific TAT values or a predetermined TAT value for the one or more downlink reference beams.

In some example embodiments, the TA validation configuration information further includes beam specific RSRP variation thresholds or a predetermined RSRP variation threshold for the one or more downlink reference beams.

In some example embodiments, the TA validation configuration information includes, as the one or more downlink reference beams, a list of Synchronization Signal Block, SSB, beams associated with CG resources for small data transmissions of the first device. In these example embodiments, the means for verifying includes means for determining a serving SSB beam of the first device corresponding to the selected CG resource; means for determining whether the serving SSB beam of the first device is included in the list of SSB beams; and means for successfully verifying TA validity of the first device in accordance with a determination that the serving SSB beam of the first device is included in the list of SSB beams.

In some example embodiments, the means for verifying includes means for failing to verify TA validity of the first device in accordance with a determination that the serving SSB beam of the first device is not included in the list of SSB beams.

In these example embodiments, the means for verifying further includes means for determining whether RSRP variation of the first device is within a beam specific RSRP variation threshold for the serving SSB beam or a predetermined RSRP variation threshold for all SSB beams in the list in accordance with a determination that the serving SSB beam of the first device is not included in the list of SSB beams; and means for successfully verifying TA validity of the first device in accordance with a determination that the RSRP variation of the first device is within the beam specific RSRP variation threshold for the serving SSB beam or a predetermined RSRP variation threshold for all SSB beams in the list.

In some example embodiments, the TA validation configuration information further includes an infinite Timing Alignment Timer, TAT, value for some or all SSB beams in the list. In these example embodiments, the means for verifying includes means for determining whether the serving SSB beam is associated with an infinite TAT value in accordance with a determination that the serving SSB beam of the first device is included in the list of SSB beams; and means for successfully verifying TA validity of the first device in accordance with a determination that the serving SSB beam is associated with the infinite TAT value.

In some example embodiments, the TA validation configuration information further includes an infinite RSRP variation value for some or all SSB beams in the list. In these example embodiments, the means for verifying includes means for determining whether the serving SSB beam is associated with an infinite RSRP variation value in accordance with a determination that the serving SSB beam of the first device is included in the list of SSB beams; and means for successfully verifying TA validity of the first device in accordance with a determination that the serving SSB beam is associated with the infinite RSRP variation value.

In some example embodiments, the TA validation configuration information includes, as the one or more downlink reference beams, a list of SSB beams associated with CG resources for small data transmissions of the first device and a list of beam specific Reference Signal Receiving Power, RSRP, thresholds corresponding to the list of SSB beams or a predetermined RSRP variation threshold for all SSB beams in the list of SSB beams. In these example embodiments, the means for verifying includes means for determining a serving SSB beam of the first device corresponding to the selected CG resource; means for determining whether the serving SSB beam of the first device is included in the list of SSB beams; means for determining a RSRP variation of the first device in accordance with a determination that the serving SSB beam of the first device is included in the list of SSB beams; means for determining whether the RSRP variation of the first device is smaller than a beam specific RSRP threshold among the list of beam specific RSRP thresholds corresponding to the serving SSB beam or the predetermined RSRP variation threshold for all SSB beams in the list of SSB beams; and means for successfully verifying TA validation of the first device in accordance with a determination that the RSRP variation of the first device is smaller than the beam specific RSRP threshold among the list of beam specific RSRP thresholds corresponding to the serving SSB beam or the predetermined RSRP variation threshold for all SSB beams in the list of SSB beams.

In these example embodiments, the means for verifying includes means for failing to verify TA validity of the first device in accordance with a determination that the serving SSB beam of the first device is not included in the list or a determination that the RSRP variation of the first device is not smaller than the beam specific RSRP thresholds among the list of beam specific RSRP thresholds corresponding to the serving SSB beam or a predetermined RSRP variation thresholds for all SSB beams in the list of SSB beams.

In some example embodiments, the TA validation configuration information includes, as the one or more downlink reference beams, a list of SSB beams associated with CG resources for small data transmissions of the first device and a list of beam specific TAT values corresponding to the list of SSB beams or a predetermined TAT value for all SSB beams in the list. In these example embodiments, the means for verifying includes means for determining a serving SSB beam of the first device corresponding to the selected CG resource; means for determining whether the serving SSB beam of the first device is included in the list of SSB beams; means for checking a TAT value of the first device in accordance with a determination that the serving SSB beam of the first device is included in the list of SSB beams; means for determining whether the TAT value of the first device is within the beam specific TAT value of the serving SSB beam or within the predetermined TAT value; and means for successfully verifying TA validation of the first device in accordance with a determination that the TAT value of the first device is within the beam specific TAT value of the serving SSB beam or within the predetermined TAT value.

In these example embodiments, the means for verifying includes means for failing to verify TA validity of the first device in accordance with a determination that the TAT value of the first device is not within the beam specific TAT value of the serving SSB beam or not within the predetermined TAT value.

In some example embodiments, the TA validation configuration information includes, as the one or more downlink reference beams, a list of SSB beams associated with CG resources for small data transmissions of the first device and a list of TA validation flags for the list of SSB beams, respectively. In these example embodiments, the means for verifying includes means for determining a serving SSB beam of the first device corresponding to the selected CG resource; means for determining whether the serving SSB beam of the first device is included in the list of SSB beams; means for determining whether a TA validation flag for the serving SSB beam indicates that a TA validation is necessary in accordance with a determination that the serving SSB beam of the first device is included in the list of SSB beams; means for determining a RSRP variation of the first device in accordance with a determination that the TA validation flag for the serving SSB beam indicates that the TA validation is necessary; means for determining whether the RSRP variation of the first device is smaller than a beam specific RSRP threshold corresponding to the serving SSB beam or the predetermined RSRP variation threshold for all SSB beams in the list of SSB beams; and means for successfully verifying TA validity of the first device in accordance with a determination that the measured RSRP of the first device is smaller than the beam specific RSRP threshold corresponding to the serving SSB beam or the predetermined RSRP variation threshold for all SSB beams in the list of SSB beams.

In these example embodiments, the means for verifying includes means for successfully verifying TA validity of the first device in accordance with a determination that the TA validation flag for the serving SSB beam indicates that the TA validation is not necessary.

In these example embodiments, the means for verifying includes means for failing to verify TA validity of the first device in accordance with a determination that the serving SSB beam of the first device is not included in the list of SSB beams or a determination that the measured RSRP of the first device is not larger than the beam specific RSRP threshold corresponding to the serving SSB beam or the predetermined RSRP variation threshold for all SSB beams in the list of SSB beams.

In some example embodiments, the TA validation configuration information includes, as the one or more downlink reference beams, a list of SSB beams associated with CG resources for small data transmissions of the first device and a list of TA validation flags for the list of SSB beams, respectively. In these example embodiments, the means for verifying includes means for determining a serving SSB beam of the first device corresponding to the selected CG resource; means for determining whether the serving SSB beam of the first device is included in the list of SSB beams; means for determining whether a TA validation flag for the serving SSB beam indicates that a TA validation is necessary in accordance with a determination that the serving SSB beam of the first device is included in the list of SSB beams; means for checking a TAT value of the first device in accordance with a determination that the TA validation flag for the serving SSB beam indicates that the TA validation is necessary; means for determining whether the TAT value of the first device is within a beam specific TAT value of the serving SSB beam or within a predetermined TAT value for all SSB beams in the list; and means for successfully verifying TA validity of the first device in accordance with a determination that the TAT value of the first device is within the beam specific TAT value of the serving SSB beam or within the predetermined TAT value for all SSB beams in the list.

In some example embodiments, the TA validation configuration information includes, as the one or more downlink reference beams, a list of SSB beams associated with CG resources for small data transmissions of the first device and a list of TA validation flags for the list of SSB beams, respectively. In these example embodiments, the means for verifying includes means for determining a serving SSB beam of the first device corresponding to the selected CG resource; means for determining whether the serving SSB beam of the first device is included in the list of SSB beams; means for determining whether a TA validation flag for the serving SSB beam indicates that a TA validation is necessary in accordance with a determination that the serving SSB beam of the first device is included in the list of SSB beams; means for determining RSRP variation of the first device in accordance with a determination that the TA validation flag for the serving SSB beam indicates that the TA validation is necessary; means for determining whether the RSRP variation of the first device is smaller than a beam specific RSRP threshold corresponding to the serving SSB beam or a predetermined RSRP threshold for all SSB beams; and means for successfully verifying TA validity of the first device in accordance with a determination that the RSRP variation of the first device is smaller than the beam specific RSRP threshold corresponding to the serving SSB beam or the predetermined RSRP threshold for all SSB beams.

In some example embodiments, the TA validation configuration information includes, as the one or more downlink reference beams, a first list of first SSB beams associated with a first group of CG resources, a second list of second SSB beams associated with a second group of CG resources and a list of beam specific RSRP thresholds corresponding to the second list or a predetermined RSRP variation threshold for all SSB beams in the second list. In these example embodiments, the means for verifying includes means for determining a serving SSB beam of the first device corresponding to the selected CG resource; means for determining that the first device is in coverage of both at least one first SSB beam of the first list and at least one second SSB beam of the second list; means for determining whether a first number of the at least one first SSB beam is larger than a second number of the at least one second SSB beam; means for determining whether the serving SSB beam of the first device is included in the first list in accordance with a determination that the first number is larger than the second number; and means for successfully verifying TA validity of the first device in accordance with a determination that the serving SSB beam of the first device is included in the first list.

In these example embodiments, the means for verifying includes means for determining whether the serving SSB beam of the first device is included in the second list in accordance with a determination that the first number is not larger than the second number; means for determining a RSRP variation of the first device in accordance with a determination that the serving SSB beam of the first device is included in the second list; means for determining whether the RSRP variation of the first device is smaller than a beam specific RSRP threshold corresponding to the serving SSB beam or the predetermined RSRP variation threshold; and means for successfully verifying TA validity of the first device in accordance with a determination that the RSRP variation of the first device is smaller than the beam specific RSRP threshold corresponding to the serving SSB beam or the predetermined RSRP variation threshold.

In these example embodiments, the means for verifying includes means for failing to verify TA validity of the first device in accordance with a determination that the serving SSB beam of the first device is not included in the first list or the second list or a determination that the RSRP variation of the first device is not larger than the beam specific RSRP threshold corresponding to the serving SSB beam or the predetermined RSRP variation threshold.

In some example embodiments, the TA validation configuration information includes, as the one or more downlink reference beams, a first list of first SSB beams associated with a first group of CG resources, a second list of second SSB beams associated with a second group of CG resources and a list of beam specific RSRP thresholds corresponding to the second list or a predetermined RSRP variation threshold for all SSB beams in the second list. In these example embodiments, the means for verifying includes means for determining a serving SSB beam of the first device corresponding to the selected CG resource; means for determining that the first device is in coverage of both at least one first SSB beam of the first list and at least one second SSB beam of the second list; means for determining whether a battery level of the first device is larger than a predetermined battery threshold; means for determining whether the serving SSB beam of the first device is included in the first list in accordance with a determination that the battery level of the first device is larger than the predetermined battery threshold; and means for successfully verifying TA validity of the first device in accordance with a determination that the serving SSB beam of the first device is included in the first list.

In these example embodiments, the means for verifying includes means for determining whether the serving SSB beam of the first device is included in the second list in accordance with a determination that the battery level of the first device is not larger than the predetermined battery threshold; means for determining a RSRP variation of the first device in accordance with a determination that the serving SSB beam of the first device is included in the second list; means for determining whether the RSRP variation of the first device is smaller than a beam specific RSRP threshold corresponding to the serving SSB beam or the predetermined RSRP variation threshold; and means for successfully verifying TA validity of the first device in accordance with a determination that the RSRP variation of the first device is smaller than the beam specific RSRP threshold corresponding to the serving SSB beam or the predetermined RSRP variation threshold.

In these example embodiments, the means for verifying includes means for failing to verify TA validity of the first device in accordance with a determination that the serving SSB beam of the first device is not included in the first list or the second list or a determination that the measured RSRP of the first device is not larger than the beam specific RSRP threshold corresponding to the serving SSB beam or the predetermined RSRP variation threshold.

In some example embodiments, the TA validation configuration information includes, as the one or more downlink reference beams, a list of SSB beams associated with CG resources and a list of beam specific RSRP thresholds in which at least two beam specific RSRP thresholds are corresponding to each SSB beam of the list of SSB beams, respectively. In these example embodiments, the means for verifying includes means for determining a serving SSB beam of the first device corresponding to the selected CG resource; means for determining that the first device is in coverage of at least two SSB beams of the list of SSB beams; means for determining a RSRP variation of the first device in accordance with a determination that the first device is in coverage of at least two SSB beams of the list of SSB beams; means for determining whether a battery level of the first device is larger than a predetermined battery threshold; means for determining whether the RSRP variation of the first device is larger than a first RSRP threshold corresponding to the serving SSB beam in accordance with a determination that the battery level of the first device is larger than the predetermined battery threshold; and means for successfully verifying TA validity of the first device in accordance with a determination that the RSRP variation of the first device is larger than the first RSRP threshold corresponding to the serving SSB beam.

In these example embodiments, the means for verifying includes means for determining whether the RSRP variation of the first device is larger than a second RSRP threshold corresponding to the serving SSB beam in accordance with a determination that the battery level of the first device is not larger than the predetermined battery threshold, wherein the second RSRP threshold is smaller than the first RSRP threshold; and means for successfully verifying TA validity of the first device in accordance with a determination that the RSRP variation of the first device is larger than the second RSRP threshold corresponding to the serving SSB beam.

In these example embodiments, the means for verifying includes means for failing to verify TA validity of the first device in accordance with a determination that the RSRP variation of the first device is not larger than the first RSRP threshold or the second RSRP threshold corresponding to the serving SSB beam.

In some example embodiments, the TA validation configuration information includes, as the one or more downlink reference beams, a first list of first SSB beams associated with a first group of CG resources, and a second list of second SSB beams associated with a second group of CG resources and a list of beam specific RSRP thresholds corresponding to the second list or a predetermined RSRP variation threshold for all SSB beams in the second list. In these example embodiments, the means for verifying includes means for determining a serving SSB beam of the first device corresponding to the selected CG resource; means for determining whether the serving SSB beam of the first device is included in the first list or the second list of SSB beams; means for successfully verifying TA validity of the first device in accordance with a determination that the serving SSB beam of the first device is included in the first list; means for determining a RSRP variation of the first device in accordance with a determination that the serving SSB beam of the first device is included in the second list; means for determining whether the RSRP variation of the first device is smaller than a beam specific RSRP threshold among the list of beam specific RSRP thresholds corresponding to the serving SSB beam or the predetermined RSRP variation threshold; and means for successfully verifying TA validity of the first device in accordance with a determination that the RSRP variation of the first device is smaller than the beam specific RSRP threshold among the list of beam specific RSRP thresholds corresponding to the serving SSB beam or the predetermined RSRP variation threshold.

In these example embodiments, the means for verifying includes means for failing to verify TA validity of the first device in accordance with a determination that the measured RSRP of the first device is not smaller than the beam specific RSRP threshold corresponding to the serving SSB beam or the predetermined RSRP variation threshold.

Figures 11, 12:
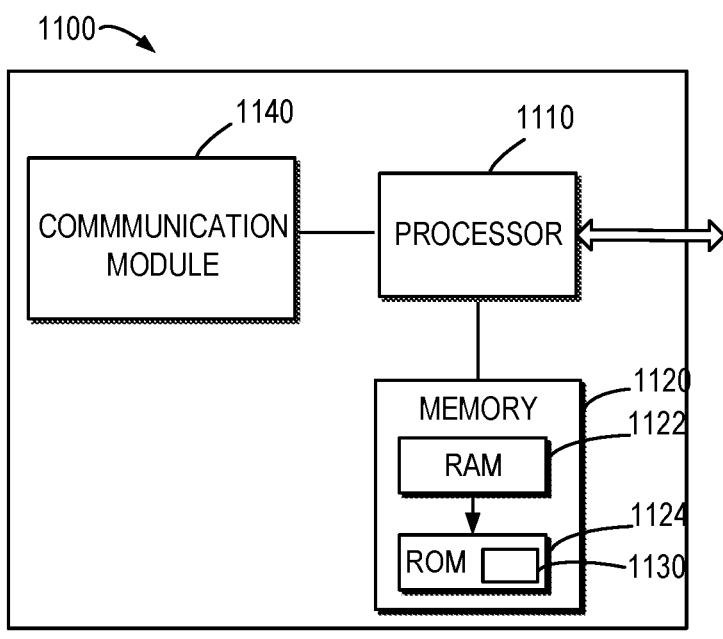
FIG. 11 illustrates a simplified block diagram of an apparatus that is suitable for implementing example embodiments of the present disclosure.
FIG. 12 illustrates a block diagram of an example computer readable medium in accordance with some example embodiments of the present disclosure.

FIG. 11 is a simplified block diagram of a device 1100 that is suitable for implementing example embodiments of the present disclosure. The device 1100 may be provided to implement the communication device, for example the terminal device 110 or the network device 120 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the memory, e.g., ROM 1124. The processor 1110 may perform any suitable actions and processing by loading the program 1130 into the RAM 1122.

The example embodiments of the present disclosure may be implemented by means of the program 1130 so that the device 1100 may perform any process of the disclosure as discussed with reference to FIGS. 2, 3, and 5 to 10. The example embodiments of the present disclosure may also be implemented by hardware or by a combination of software and hardware.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium 1200 has the program 1130 stored thereon.

In the description, the solution of the present disclosure is described by taking the terminal device as the first device and the network device as the second device. However, those skilled in the art may understand that the present disclosure is not limited thereto, where applicable, the operations of the terminal device may also be implemented at the network, and vice versa.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the processes 200, 300, 500 to 1000 as described above with reference to FIGS. 2, 3 and 5-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory including computer program codes;

wherein the at least one memory and the computer program codes are configured to, with the at least one processor, cause the first device to:

receive, from a second device, a configured grant (CG) resource configuration for small data transmission associated with one or more downlink reference beams for an inactive state of the first device;

receive, from the second device, Timing Advance (TA) validation configuration information associated with the CG resource configuration, wherein the TA validation configuration information comprises an infinite timing alignment timer (TAT) value;

select a CG resource to transmit a data packet to the second device based on the CG resource configuration; and determine, based at least on the TA validation configuration information and the selected CG resource, TA validity of the first device.

2. The first device of claim 1, wherein the TA validation configuration information is carried in a Radio Resource Control (RRC) Release message with suspend configuration.

3. The first device of claim 2, wherein the RRC Release message with suspend configuration further comprising the CG resources configuration for small data transmission of the first device.

4. The first device of claim 1, wherein the first device is caused to:

determine TA validity of the first device by determining a serving Synchronization Signal Bloc (SSB) beam is associated with an infinite TAT value in accordance with a determination that the serving SSB beam of the first device is included in a list of SSB beams.

5. The first device of claim 1, wherein the TA validation configuration information further includes beam specific RSRP variation thresholds or a predetermined RSRP variation threshold for the one or more downlink reference beams.

6. The first device of claim 1, wherein the TA validation configuration information includes, as the one or more downlink reference beams, a list of Synchronization Signal Block beams associated with CG resources for small data transmission of the first device, and wherein the first device is caused to determine the TA validity of the first device by:

determining a serving SSB beam of the first device corresponding to the selected CG resource;

determining whether the serving SSB beam of the first device is included in the list of SSB beams; and successfully verifying the TA validity of the first device in accordance with a determination that the serving SSB beam of the first device is included in the list of SSB beams.

7. The first device of claim 6, wherein the first device is caused to determine the TA validity of the first device further by:

determining whether Reference Signal Receiving Power (RSRP) variation of the first device is within a beam specific RSRP variation threshold for the serving SSB beam or a predetermined RSRP variation threshold for all SSB beams in the list in accordance with a determination that the serving SSB beam of the first device is not included in the list of SSB beams; and successfully verifying the TA validity of the first device in accordance with a determination that the RSRP variation of the first device is within a beam specific RSRP variation threshold for the serving SSB beam or a predetermined RSRP variation threshold for all SSB beams in the list.

8. The first device of claim 6, wherein the TA validation configuration information further includes an infinite TAT value for some or all SSB beams in the list, and wherein the first device is caused to determine the TA validity of the first device further by determining whether the serving SSB beam is associated with an infinite TAT value in accordance with a determination that the serving SSB beam of the first device is included in the list of SSB beams; and successfully verifying the TA validity of the first device in accordance with a determination that the serving SSB beam is associated with the infinite TAT value.

9. The first device of claim 1, wherein the TA validation configuration information includes, as the one or more downlink reference beams, a list of SSB beams associated with CG resources for small data transmission of the first device and a list of beam specific RSRP thresholds corresponding to the list of SSB beams or a predetermined RSRP variation threshold for all SSB beams in the list of SSB beams, wherein the first device is caused to determine the TA validity of the first device by determining a serving SSB beam of the first device corresponding to the selected CG resource;

determining whether the serving SSB beam of the first device is included in the list of SSB beams;

determining a RSRP variation of the first device in accordance with a determination that the serving SSB beam of the first device is included in the list of SSB beams;

determining whether the RSRP variation of the first device is smaller than a beam specific RSRP threshold among the list of beam specific RSRP thresholds corresponding to the serving SSB beam or the predetermined RSRP variation threshold for all SSB beams in the list of SSB beams; and successfully verifying the TA validation of the first device in accordance with a determination that the RSRP variation of the first device is smaller than the beam specific RSRP threshold among the list of beam specific RSRP thresholds corresponding to the serving SSB beam or the predetermined RSRP variation threshold for all SSB beams in the list of SSB beams.

10. The first device of claim 1, wherein the TA validation configuration information includes, as the one or more downlink reference beams, a list of SSB beams associated with CG resources for small data transmission of the first device and a list of beam specific TAT values corresponding to the list of SSB beams or a predetermined TAT value for all SSB beams in the list; and wherein the first device is caused to determine the TA validity of the first device further by:

failing to verify the TA validity of the first device in accordance with a determination that a TAT value of the first device is not within a beam specific TAT value of a serving SSB beam or not within the predetermined TAT value.

11. The first device of claim 1, wherein the TA validation configuration information includes, as the one or more downlink reference beams, a list of SSB beams associated with CG resources for small data transmission of the first device and a list of TA validation flags for the list of SSB beams, respectively, and wherein the first device is caused to determine the TA validity of the first device further by:

determining a serving SSB beam of the first device corresponding to the selected CG resource;

determining whether the serving SSB beam of the first device is included in the list of SSB beams;

determining whether a TA validation flag for the serving SSB beam indicates that a TA validation is necessary in accordance with a determination that the serving SSB beam of the first device is included in the list of SSB beams;

determining a RSRP variation of the first device in accordance with a determination that the TA validation flag for the serving SSB beam indicates that the TA validation is necessary;

determining whether the RSRP variation of the first device is smaller than a beam specific RSRP threshold corresponding to the serving SSB beam or the predetermined RSRP variation threshold for all SSB beams in the list of SSB beams; and successfully verifying the TA validity of the first device in accordance with a determination that the measured RSRP of the first device is smaller than the beam specific RSRP threshold corresponding to the serving SSB beam or the predetermined RSRP variation threshold for all SSB beams in the list of SSB beams.

12. The first device of claim 1, wherein the first device is caused to determine the TA validity of the first device further by:

successfully verifying the TA validity of the first device in accordance with a determination that the TA validation flag for the serving SSB beam indicates that the TA validation is not necessary.

13. The first device of claim 1, wherein the TA validation configuration information includes, as the one or more downlink reference beams, a list of SSB beams associated with CG resources for small data transmission of the first device and a list of TA validation flags for the list of SSB beams, respectively, and wherein the first device is caused to determine the TA validity of the first device further by determining a serving SSB beam of the first device corresponding to the selected CG resource;

determining whether the serving SSB beam of the first device is included in the list of SSB beams;

determining whether a TA validation flag for the serving SSB beam indicates that a TA validation is necessary in accordance with a determination that the serving SSB beam of the first device is included in the list of SSB beams;

checking a TAT value of the first device in accordance with a determination that the TA validation flag for the serving SSB beam indicates that the TA validation is necessary;

determining whether the TAT value of the first device is within a beam specific TAT value of the serving SSB beam or within a predetermined TAT value for all SSB beams in the list; and successfully verifying the TA validity of the first device in accordance with a determination that the TAT value of the first device is within the beam specific TAT value of the serving SSB beam or within the predetermined TAT value for all SSB beams in the list.

14. A method comprising:

receiving, from a second device, configured grant (CG) resource configuration for small data transmission associated with one or more downlink reference beams for an inactive state of a first device;

receiving, from the second device, timing advance (TA) validation configuration information associated with the CG resource configuration, wherein the TA validation configuration information comprises an infinite timing alignment timer (TAT) value;

selecting a CG resource to transmit a data packet to the second device based on the CG resource configuration of the first device; and determining, based at least on the TA validation configuration information and the selected CG resource, TA validity of the first device.

15. The method of claim 14, wherein the TA validation configuration information is carried in a Radio Resource Control (RRC) Release message with suspend configuration.

16. The method of claim 15, wherein the RRC Release message with suspend configuration further comprising the CG resources configuration for the first device.

17. The method of claim 14, wherein the TA validation configuration information comprising an infinite timing alignment (TAT) value.

18. The method of claim 14, wherein determining TA validity of the first device comprising determining a serving SSB beam is associated with an infinite TAT value in accordance with a determination that the serving Synchronization Signal Bloc (SSB) beam of the first device is included in a list of SSB beams.

19. A non-transitory computer readable medium comprising program instructions for causing a first device to perform at least:

receiving, from a second device, configured grant (CG) resource configuration for small data transmission associated with one or more downlink reference beams for an inactive state of the first device;

receiving, from the second device, timing advance (TA) validation configuration information associated with the CG resource configuration, wherein the TA validation configuration information comprises an infinite timing alignment timer (TAT) value;

selecting a CG resource to transmit a data packet to the second device based on the CG resource configuration of the first device; and determining, based at least on the TA validation configu-
ration information and the selected CG resource, TA
validity of the first device.

* * * * *